(12) United States Patent
Shin et al.

(10) Patent No.: US 12,034,224 B2
(45) Date of Patent: Jul. 9, 2024

(54) ELECTRONIC DEVICE COMPRISING ANTENNA

(71) Applicant: SAMSUNG ELECTRONICS CO., LTD., Suwon-si (KR)

(72) Inventors: Donghun Shin, Suwon-si (KR); Mincheol Seo, Suwon-si (KR); Hongpyo Bae, Suwon-si (KR); Youngjun Cho, Suwon-si (KR); Gyubok Park, Suwon-si (KR); Jinkyu Bang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 124 days.

(21) Appl. No.: 17/885,429

(22) Filed: Aug. 10, 2022

(65) Prior Publication Data

US 2022/0384953 A1 Dec. 1, 2022

Related U.S. Application Data

(63) Continuation of application No. PCT/KR2021/001823, filed on Feb. 10, 2021.

(51) Int. Cl.
*H01Q 1/24* (2006.01)
*H01Q 5/364* (2015.01)

(52) U.S. Cl.
CPC ............ *H01Q 5/364* (2015.01); *H01Q 1/241* (2013.01)

(58) Field of Classification Search
CPC .......... H01Q 5/364; H01Q 1/241; H01Q 7/00; H01Q 9/42; H01Q 13/10; H01Q 21/28
See application file for complete search history.

(56) References Cited

U.S. PATENT DOCUMENTS

| 10,015,294 B2 | 7/2018 | Lee et al. |
| 10,153,539 B2 | 12/2018 | Seo et al. |

(Continued)

FOREIGN PATENT DOCUMENTS

| KR | 10-1317897 | 10/2013 |
| KR | 10-2016-0105244 | 9/2016 |

(Continued)

OTHER PUBLICATIONS

Korean Office Action issued Jan. 1, 2024 in corresponding Korean Patent Application No. 10-2020-0015731.

*Primary Examiner* — Dieu Hien T Duong
(74) *Attorney, Agent, or Firm* — Nixon & Vanderhye, P.C.

(57) ABSTRACT

According to an embodiment of the disclosure, an electronic device comprises: a housing including a front plate, a rear plate positioned on the opposite side from the front plate, and a side bezel surrounding at least part of the space between the front plate and the rear plate, and including a first conduction unit comprising a conductor, a second conduction unit comprising a conductor positioned such that a first segment is between the second conduction unit and one end of the first conduction unit, and a third conduction unit comprising a conductor positioned such that a second segment is between the third conduction unit and an other end of the first conduction unit; a support positioned inside the space and connected to the first conduction unit, the second conduction unit, and the third conduction unit, and which includes a first opening extending from the first segment and positioned within a specified proximity of the first conduction unit; a printed circuit board positioned inside the space between the support and the rear plate, and including first and second terminals electrically connected to at least part of the support surrounding the first opening, a ground plane, a first electrical path electrically connecting (Continued)

the second terminal and a first position of the ground plane, and a second electrical path electrically connecting the second terminal and a second position of the ground plane; and a wireless communication circuit electrically connected to the first terminal and configured to transmit and/or receive signals in a selected or designated frequency band, wherein, when viewed from above the rear plate, at least part of the first opening may extend to the first segment by passing between the first terminal and the second terminal.

15 Claims, 20 Drawing Sheets

(56) References Cited

U.S. PATENT DOCUMENTS

| | | |
|---|---|---|
| 10,230,154 B2 | 3/2019 | Jeon et al. |
| 10,355,415 B2 | 7/2019 | Kim et al. |
| 10,741,904 B2 | 8/2020 | Kim et al. |
| 10,951,260 B2 | 3/2021 | Jung et al. |
| 2017/0047639 A1 | 2/2017 | Lee et al. |
| 2017/0244149 A1* | 8/2017 | Kim .................. H01Q 5/35 |
| 2017/0244818 A1 | 8/2017 | Kim et al. |
| 2021/0151886 A1* | 5/2021 | Wang .................. H01Q 9/42 |

FOREIGN PATENT DOCUMENTS

| | | |
|---|---|---|
| KR | 10-2017-0020013 | 2/2017 |
| KR | 10-2017-0097396 | 8/2017 |
| KR | 10-2018-0109444 | 10/2018 |
| KR | 10-2018-0109509 | 10/2018 |
| KR | 10-2019-0094454 | 8/2019 |

* cited by examiner

ELECTRONIC DEVICE COMPRISING ANTENNA

CROSS-REFERENCE TO RELATED APPLICATIONS

This application is a continuation of International Application No. PCT/KR2022/001823 designating the United States, filed on Feb. 10, 2021, in the Korean Intellectual Property Receiving Office and claiming priority to Korean Patent Application No. 10-2020-0015731, filed on Feb. 10, 2020, in the Korean Intellectual Property Office, the disclosures of which are incorporated by reference herein in their entireties.

BACKGROUND

Field

The disclosure relates to an electronic device including an antenna.

Description of Related Art

In line with the development of wireless communication technology, electronic devices are commonly used in daily life, and the use of content is exponentially increasing due to this. Due to such a significant increase in use of content, network capacity is gradually reaching its limit. Electronic devices include a plurality of antennas to support various communication technologies.

As applications usable in the electronic devices such as smartphones diversify, the number of antennas included in the electronic devices is continuously increasing. While electronic devices are becoming slimmer, components for various functions are being added, so it is becoming more difficult to design an antenna in a limited space in order to secure radiation performance in a desired frequency band or coverage (a communication range) while reducing the electrical influence by various elements in the electronic device.

SUMMARY

Embodiments of the disclosure may provide an electronic device including an antenna for improving or securing antenna radiation performance or securing coverage in a limited antenna design space.

An electronic device according to an example embodiment of the disclosure may include: a housing including a front plate, a rear plate positioned on the opposite side of the front plate, and a side bezel surrounding at least a portion of a space between the front plate and the rear plate, and includes a first conduction unit comprising a conductor, a second conduction unit comprising a conductor positioned such that a first segment is interposed between the second conduction unit and one end of the first conduction unit, and a third conduction unit comprising a conductor positioned such that a second segment is interposed between the third conduction unit and an opposite end of the first conduction unit, a support positioned inside the space to be connected to the first conduction unit, the second conduction unit, and the third conduction unit, and including a first opening extending from the first segment to be positioned near the first conduction unit, a printed circuit board positioned between the support and the rear plate in the space and including a first terminal and a second terminal electrically connected to at least a portion of the support surrounding the first opening, a ground plane, a first electrical path electrically connecting the second terminal to a first position of the ground plane, and a second electrical path electrically connecting the second terminal to a second position of the ground plane, and a wireless communication circuit electrically connected to the first terminal and configured to transmit and/or receive a signal in a selected or specified frequency band, wherein, when viewed from above of the rear plate, at least a portion of the first opening may extend to the first segment by passing between the first terminal and the second terminal.

According to an example embodiment of the disclosure, an efficient and integrated antenna system is able to be implemented by addressing a limited space of an electronic device. It is easy to electromagnetically isolate the antenna system from surrounding antenna radiators, based on a flow path (or current distribution) of radiation current.

In addition, effects obtained or predicted from various embodiments of the disclosure will be disclosed directly or implicitly in the detailed description of the embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described in greater detail with reference to the accompanying drawings.

Figure 1:
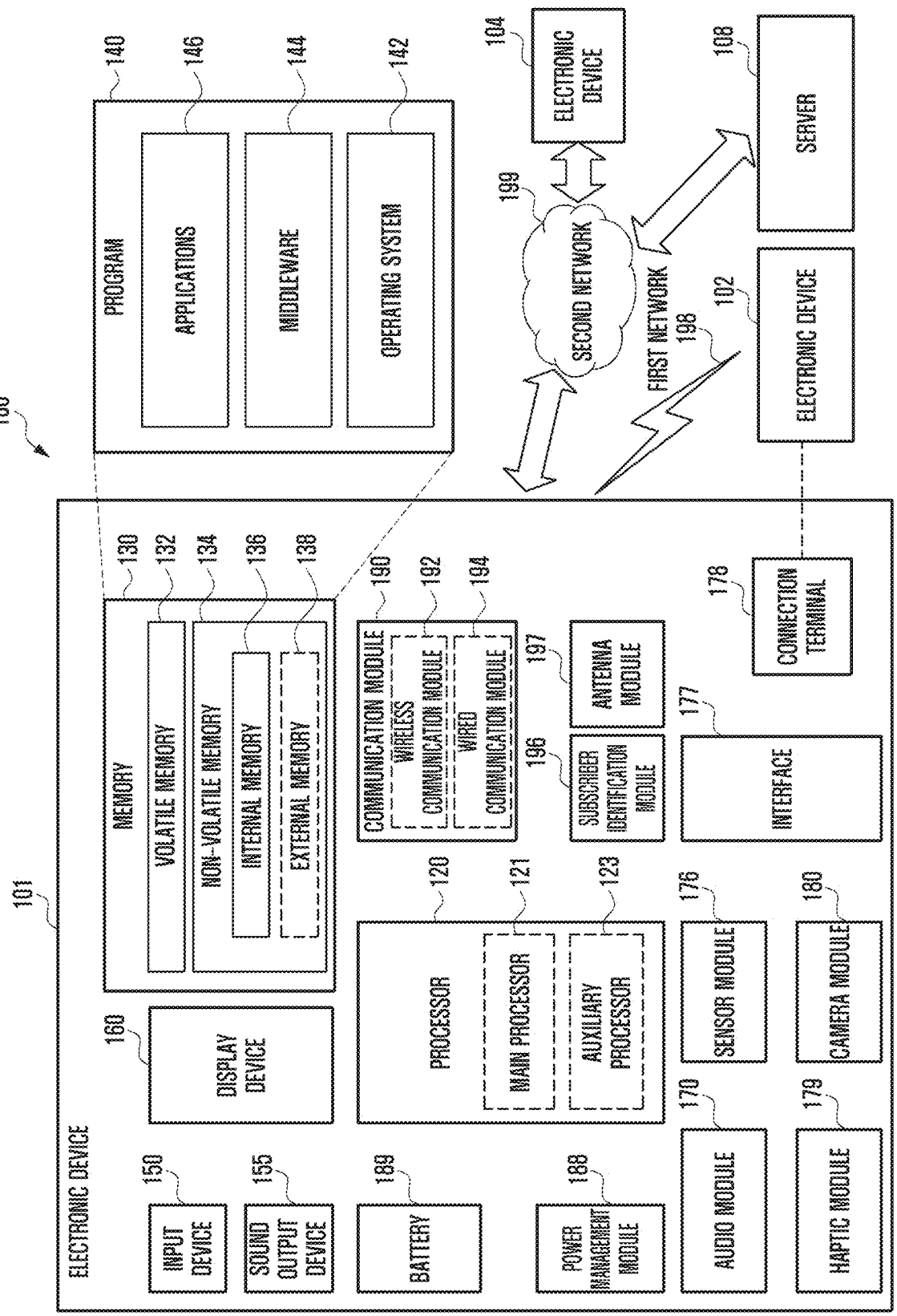
FIG. 1 is a block diagram illustrating an example electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store, for example, various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include a gesture sensor, a gyro sensor, an atmospheric pressure sensor, a magnetic sensor, an acceleration sensor, a grip sensor, a proximity sensor, a color sensor, an infrared (IR)

sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of a power management integrated circuit (PMIC).

The battery 189 may supply power to at least one component of the electronic device 101. According to an embodiment, the battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
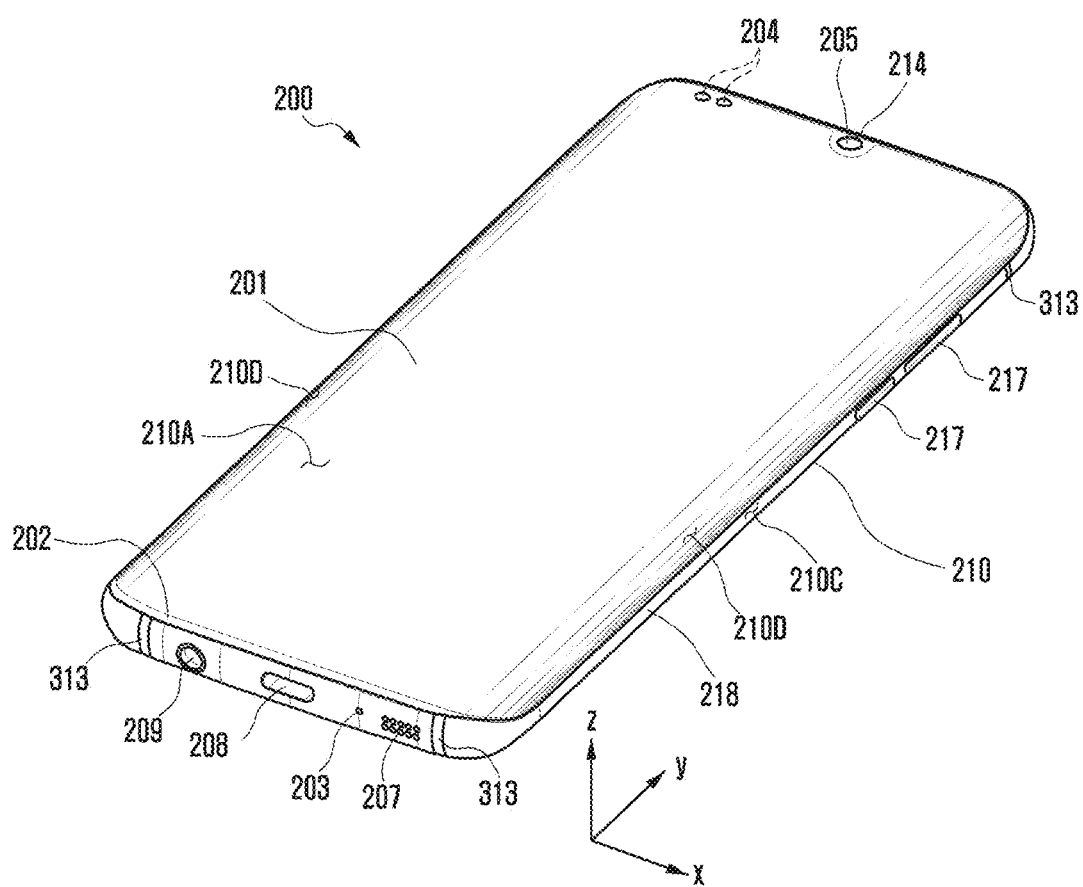
FIG. 2A is a front perspective view of a mobile electronic device according to various embodiments.
Figure 2B:
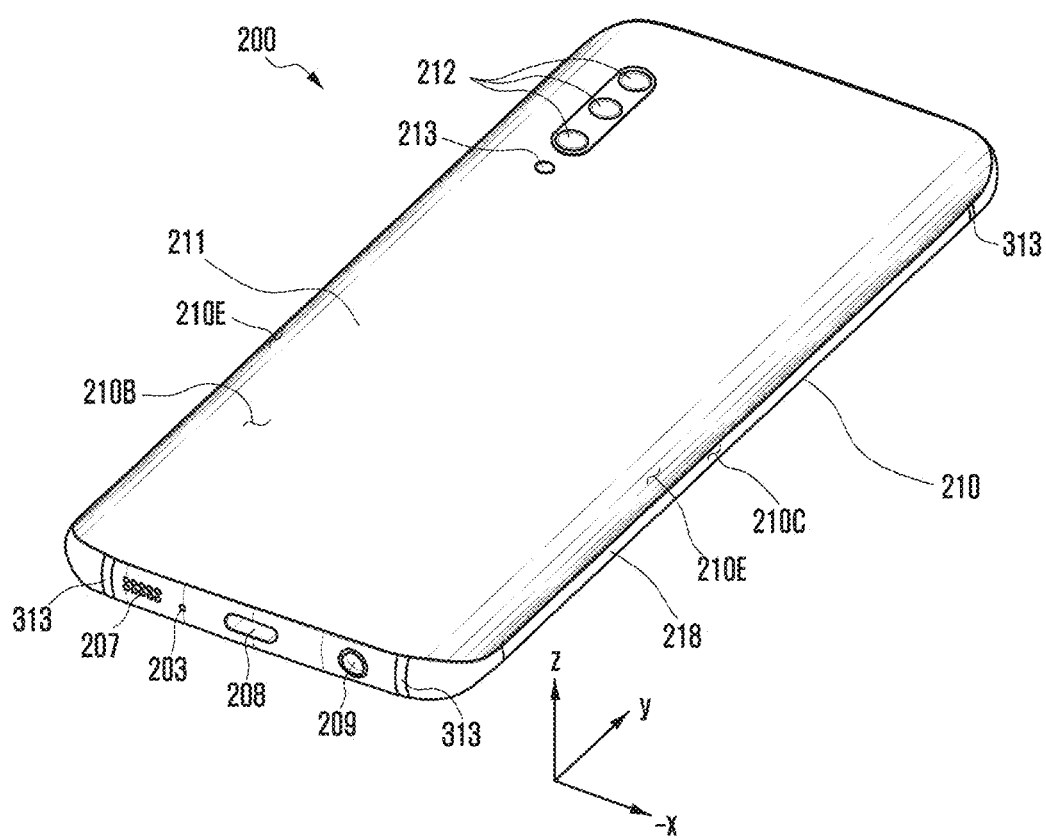
FIG. 2B is a rear perspective view of the electronic device in FIG. 2A according to various embodiments.

FIG. 2A is a front perspective view of a mobile electronic device 200 according to various embodiments. FIG. 2B is a rear perspective view of the electronic device 200 in FIG. 2A according to various embodiments.

According to various embodiments, the electronic device 200 in FIG. 2A may include the electronic device 101 in FIG. 1.

Referring to FIGS. 2A and 2B, in an embodiment, the electronic device 200 may include a housing 210 including a first surface (or front surface) 210A, a second surface (or rear surface) 210B, and a side surface 210C surrounding a space between the first surface 210A and the second surface 210B. In an embodiment (not shown), the housing may indicate a structure that forms a part of the first surface 210A, the second surface 210B, and the side surface 210C. According to an embodiment, the first surface 210A may be formed by a front plate 202 (e.g., a glass plate including various coating layers, or a polymer plate) at least a portion of which is substantially transparent. The second surface 210B may be formed by a substantially opaque rear plate 211. The rear plate 211 may be formed of, for example, coated or tinted glass, ceramic, polymer, metal (e.g., aluminum, stainless steel (STS), or magnesium), or a combination of at least two of the above materials. The side surface 210C may be coupled to the front plate 202 and the rear plate 211 and may be formed in a side bezel structure (or "side member") 218 including metal and/or polymer. In various embodiments, the rear plate 211 and the side bezel structure 218 may be integrally formed and include the same material (e.g., a metal material such as aluminum).

Referring to FIG. 2A, the front plate 202 may include two first areas 210D that seamlessly extend to be bent from the front surface 210A toward the rear plate 211. The first areas 210D may be formed adjacent to both long edges (not shown) of the front plate 202, respectively. Referring to FIG. 2B, the rear plate 211 may include two second areas 210E that seamlessly extend to be bent from the rear surface 210B toward the front plate 202. The second areas 210E may be formed adjacent to both long edges (not shown) of the rear plate 211, respectively. The side surface 210C may have a first thickness (or width) (e.g., a height in the z-axis direction) at the sides other than the first areas 210D or the second areas 210E and a second thickness, which is less than the first thickness, at the sides of the first areas 210D or the second areas 210E. In various embodiments (not shown), the front plate 202 may be implemented to include one of the first areas 210D or may be implemented to exclude the curved first areas 210D. In various embodiments (not shown), the rear plate 211 may be implemented to include one of the second areas 210E or may be implemented to exclude the curved second areas 210E.

According to an embodiment, the electronic device 200 may include at least one or more of a display 201, audio modules 203, 207, and 214, a sensor module 204, camera modules 205, 212, and 213, key input devices 217, and connector holes 208 and 209. In various embodiments, the electronic device 200 may exclude at least one (e.g., key input devices 217) of the elements or further include other components (e.g., a fingerprint sensor or a light-emitting device).

The display 201 may be visually exposed (e.g., visible) through, for example, a substantial portion of the front plate 202. In various embodiments, the edge of the display 201 may be formed to be substantially the same as the outer shape of the front plate 202 adjacent thereto. In an embodiment (not shown), in order to expand the area through which the display 201 is visible, the distance between the periphery of the display 201 and the periphery of the front plate 202 may be substantially the same.

In an embodiment (not shown), a recess or opening may be formed in a portion of a screen display area of the display 201, and at least one of an audio module 214, a sensor module 204, and a first camera device 205 aligned with the recess or opening may be included. In an embodiment (not shown), at least one or more of the audio module 214, the sensor module 204, and the camera module 205 may be positioned adjacent to the rear surface of a screen display area (e.g., an active area) of the display 201. In an embodiment (not shown), the display 201 may be coupled to a touch detection circuit, a pressure sensor capable of measuring the intensity (pressure) of a touch, and/or a digitizer for detecting a magnetic-field type stylus pen or may be disposed adjacent thereto.

The audio modules 203, 207, and 214 may include a microphone hole 203 and speaker holes 207 and 214. A microphone for obtaining an external sound may be disposed in the microphone hole 203, and in various embodiments, a plurality of microphones may be disposed to detect the direction of sound. The speaker holes 207 and 214 may include an external speaker hole 207 and a call receiver hole 214. In various embodiments, the speaker holes 207 and 214 and the microphone hole 203 may be implemented as a single hole, or a speaker without the speaker holes 207 and 214 may be included (e.g., a piezo speaker).

The sensor module 204 may produce an electrical signal or data value corresponding to an internal operation state of the electronic device 200 or an external environmental state. The sensor module 204 may include, for example, a proximity sensor that produces a signal regarding the proximity of an external object, based on the light passing through a partial area of the first surface 210A of the housing 210. According to various embodiments, the sensor module 204 may be various biometric sensors, such as a fingerprint sensor, for detecting biometric information, based on the light passing through a partial area of the first surface 210A. According to various embodiments, the fingerprint sensor may be disposed on the rear surface of the display 301. According to various embodiments (not shown), the sensor module may include an HRM sensor and/or a fingerprint sensor positioned adjacent the second surface 210B of the housing 210. The electronic device 200 may include a sensor module that is not shown, for example, at least one of a gesture sensor, a gyro sensor, an atmosphere pressure sensor, a magnetic sensor, an acceleration sensor, a grip sensor, a color sensor, an infrared (IR) sensor, a biometric sensor, a temperature sensor, a humidity sensor, and an illuminance sensor (e.g., the sensor module 204).

The camera modules 205, 212, and 213 may include, for example, a first camera device 205, a second camera device 212, and/or a flash 213. The first camera device 205 may generate an image signal, based on the light passing through a partial area of the first surface 210A of the housing 210. The second camera device 212 and the flash 213 may be disposed on the second surface 210B of the housing 210. The camera devices 205 and 212 may include one or more lenses, an image sensor, and/or an image signal processor. The flash 213 may include, for example, a light-emitting diode or a xenon lamp. In various embodiments, two or more lenses (infrared cameras, wide angle and telephoto lenses) and image sensors may be disposed on one side of the electronic device 200.

The key input devices 217 may be disposed on the side surface 210C of the housing 210. In an embodiment, the electronic device 200 may exclude some or all of the above-mentioned key input devices 217, and the excluded key input devices 217 may be implemented in other forms such as soft keys on the display 201. In various embodiments, the key input device may include a sensor module (not shown) disposed on the second surface 210B of the housing 210.

A light-emitting device (not shown) may be positioned inside the housing 210 so as to be adjacent to, for example, the first surface 210A. The light-emitting device may provide, for example, state information of the electronic device 200 in the form of light. In an embodiment, the light-emitting device may provide, for example, a light source that is associated with the operation of the first camera device 205. The light-emitting device may include, for example, an LED, an IR LED, or a xenon lamp.

The connector holes 208 and 209 may include a first connector hole 208 capable of receiving a connector (e.g., a USB connector) for transmitting and receiving power and/or data to and from an external electronic device and/or a second connector hole (e.g., an earphone jack) 209 capable of receiving a connector for transmitting and receiving audio signals to and from an external electronic device.

Figure 3:
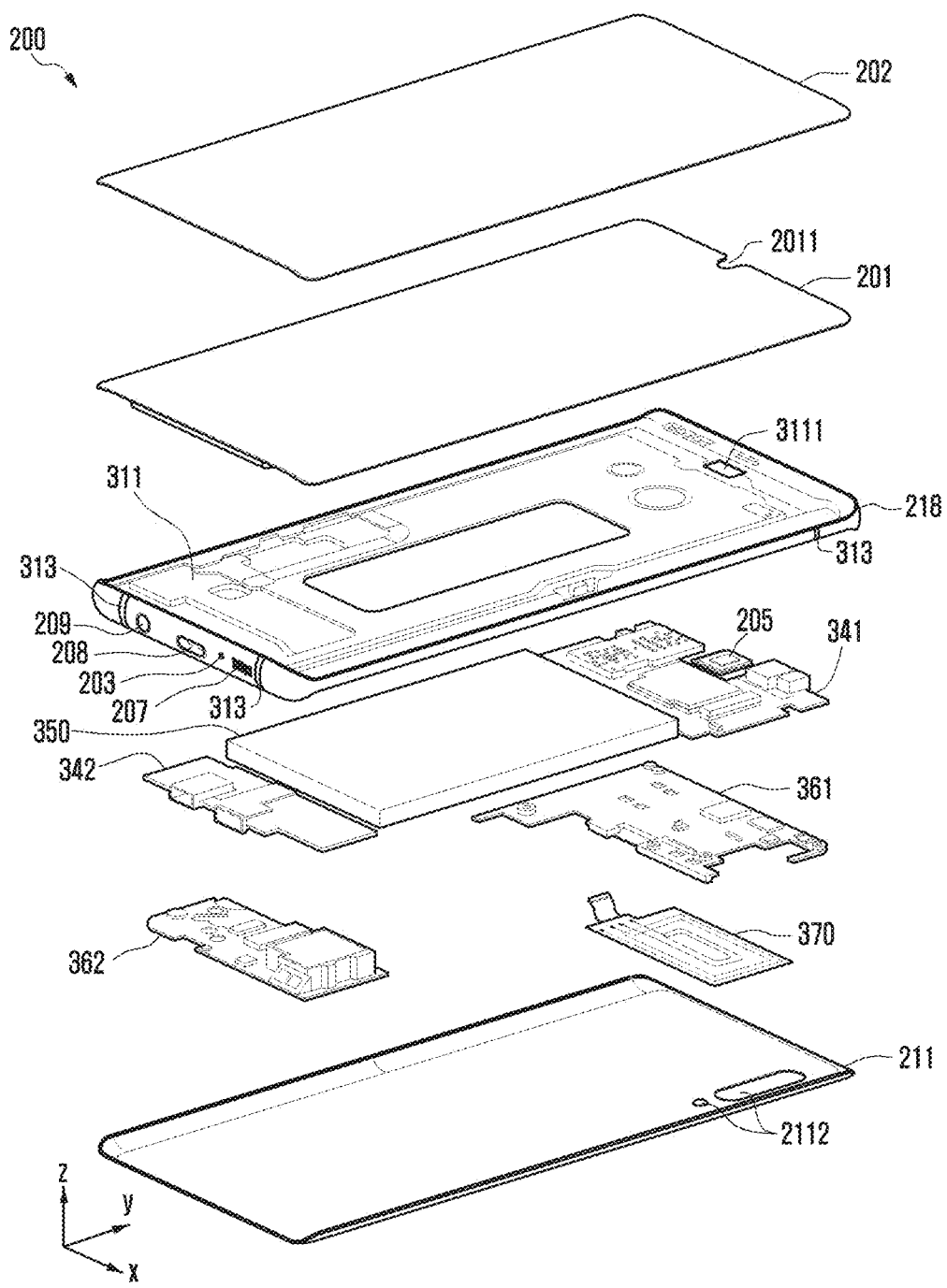
FIG. 3 is an exploded perspective view of the electronic device in FIG. 2A according to various embodiments.

FIG. 3 is an exploded perspective view of the electronic device 200 in FIG. 2A according to various embodiments.

Referring to FIG. 3, according to an embodiment, the electronic device 200 may include side bezel structure 218, a first support member 311 (e.g., a bracket), a front plate 202, a display 201, a first substrate assembly 341, a second substrate assembly 342, a battery 350, a second support member 361, a third support member 362, an antenna structure 370, or a rear plate 211. In various embodiments, the electronic device 200 may exclude at least one (e.g., the second support member 361 or the third support member 362) of the elements or further include other elements.

The first support member 311 may be disposed, for example, inside the electronic device 200 to be connected to the side bezel structure 218, or may be integrally formed with the side bezel structure 218. The first support member 311 may be formed of, for example, a metal material. According to an embodiment, the electronic device 200 may include a non-conductive member (not shown) connected to the first support member 311. The non-conductive member may be formed to be coupled to the first support member 311 through, for example, insert injection. Referring to FIGS.

2A, 2B, and 3, according to an embodiment, the side bezel structure 218 may include a plurality of conduction units separated by segments disposed therebetween. The non-conductive member may extend to the segment to form an insulating part 313 between the plurality of conduction units. The insulating part 313 may form a part of the side surface 210C (see FIG. 2A or 2B). In various embodiments, the first support member 311 may be implemented in a structure in which a conductive member and/or a non-conductive member are coupled.

For example, the display 201 may be coupled to one surface of the first support member 311 and disposed between the first support member 311 and the front plate 202. The first substrate assembly 341 and the second substrate assembly 342, for example, may be coupled to the opposite surface of the first support member 311 and disposed between the first support member 311 and the rear plate 211.

According to an embodiment, the first substrate assembly 341 may include a first printed circuit board (PCB) (not shown). The display 201 or the first camera device 205 may be electrically connected to the first printed circuit board through various electrical paths such as a flexible printed circuit board (FPCB). The first substrate assembly 341 may include various electronic components electrically connected to the first printed circuit board. The electronic components may be disposed on the first printed circuit board or may be electrically connected to the first printed circuit board through electrical paths such as a cable or FPCB. The electronic components may include, for example, at least some of the elements included in the electronic device 101 in FIG. 1.

According to various embodiments, the first substrate assembly 341 may include a main PCB, a slave PCB disposed to partially overlap the main PCB, and/or an interposer substrate between the main PCB and the slave PCB.

According to an embodiment, the second substrate assembly 342 may be disposed to be spaced apart from the first substrate assembly 341 with the battery 350 interposed therebetween when viewed from above the front plate 202. The second substrate assembly 342 may include a second printed circuit board electrically connected to the first printed circuit board of the first substrate assembly 341. The second substrate assembly 342 may include various electronic components electrically connected to the second printed circuit board. The electronic components may be disposed on the second printed circuit board or may be electrically connected to the second printed circuit board through electrical paths such as a cable or FPCB. The electronic component may include, for example, some of the elements included in the electronic device 101 in FIG. 1. According to an embodiment, the electronic components may include a USB connector utilizing the first connector hole 208, an earphone jack utilizing the second connector hole 209, a microphone utilizing the microphone hole 203, or a speaker utilizing the speaker hole 207.

According to an embodiment, the battery 350 may be disposed between the first support member 311 and the rear plate 211, and may be coupled to the first support member 311. The battery 350 is a device for supplying power to at least one element of the electronic device 200 and may include, for example, a non-rechargeable primary battery, a rechargeable secondary battery, or a fuel cell. At least a portion of the battery 350, for example, may be disposed on substantially the same plane as the first printed circuit board of the first substrate assembly 341 or the second printed circuit board of the second substrate assembly 342. The battery 350 may be integrally disposed inside the electronic device 200 or may be disposed detachably from the electronic device 200.

According to an embodiment, the second support member 361 may be disposed between the first support member 311 and the rear plate 211 and coupled to the first support member 311 through a fastening element such as a bolt. At least a portion of the first substrate assembly 341 may be disposed between the first support member 311 and the second support member 361, and the second support member 361 may cover the first substrate assembly 341 to protect the same.

According to an embodiment, the third support member 362 may be disposed to be spaced apart from the second support member 361 with the battery 350 interposed therebetween when viewed from above the front plate 202. The third support member 362 may be disposed between the first support member 311 and the rear plate 211 and coupled to the first support member 311 through a fastening element such as a bolt. At least a portion of the second substrate assembly 342 may be disposed between the first support member 311 and the third support member 362, and the third support member 362 may cover the second substrate assembly 342 to protect the same.

According to an embodiment, the second support member 361 and/or the third support member 362 may be formed of a metal material and/or a non-metal material (e.g., polymer). According to various embodiments, the second support member 361 and/or the third support member 362 may be referred to as a rear case.

According to various embodiments (not shown), an integral substrate assembly including the first substrate assembly 341 and the second substrate assembly 342 may be implemented. In this case, the substrate assembly may further include a portion extending between the battery 350 and the side member 218. In this case, according to various embodiments, an integral support member including the second support member 361 and the third support member 362 may be implemented.

According to an embodiment, the antenna structure 370 may be disposed between the second support member 361 and the rear plate 211. For example, the antenna structure 370 may be implemented in the form of a film such as an FPCB. According to an embodiment, the antenna structure 370 may include at least one conductive pattern used as a loop-type radiator. For example, the at least one conductive pattern may include a planar spiral conductive pattern (e.g., a planar coil or a pattern coil).

According to an embodiment, the conductive pattern of the antenna structure 370 may be electrically connected to a wireless communication circuit (e.g., the wireless communication module 192 in FIG. 1) disposed in the first substrate assembly 341. For example, the conductive pattern may be utilized for short-range wireless communication such as near field communication (NFC). As another example, the conductive pattern may be utilized for magnetic secure transmission (MST) for transmitting and/or receiving a magnetic signal.

According to various embodiments, the conductive pattern of the antenna structure 370 may be electrically connected to a power transmission/reception circuit disposed on the first substrate assembly 341. The power transmission/reception circuit may wirelessly receive power from an external electronic device or wirelessly transmit power to an external electronic device through the conductive pattern. The power transmission/reception circuit may include a power management integrated circuit (PMIC) or a charger integrated circuit (IC) included in the power management module 188 in FIG. 1 and charge the battery 350 using power received through the conductive pattern.

According to an embodiment, the display 201 has an opening 2011 formed in at least a partial area corresponding to an optical sensor (e.g., a first camera device 205 or a biometric sensor) disposed inside the electronic device 200. The opening 2011 may be formed, for example, in the form of a notch. According to various embodiments, the opening 2011 may be implemented in the form of a through hole. In an embodiment, the first support member 311 may include an opening 3111 positioned to correspond to the opening 2011 of the display 201. The optical sensor may receive external light through the opening 2011 of the display 201, an opening 3111 of the first support member 311, and a partial area of the front plate 202 aligned therewith. According to various embodiments (not shown), a substantially transparent area may be implemented to be formed by changing a pixel structure and/or a wiring structure, replacing the opening 2011 of the display 201.

According to an embodiment, the rear plate 211 may include an opening 2112 for disposing the second camera device 212 and the flash 213 included in the first substrate assembly 341 to be exposed the rear surface 210B.

Figure 4:
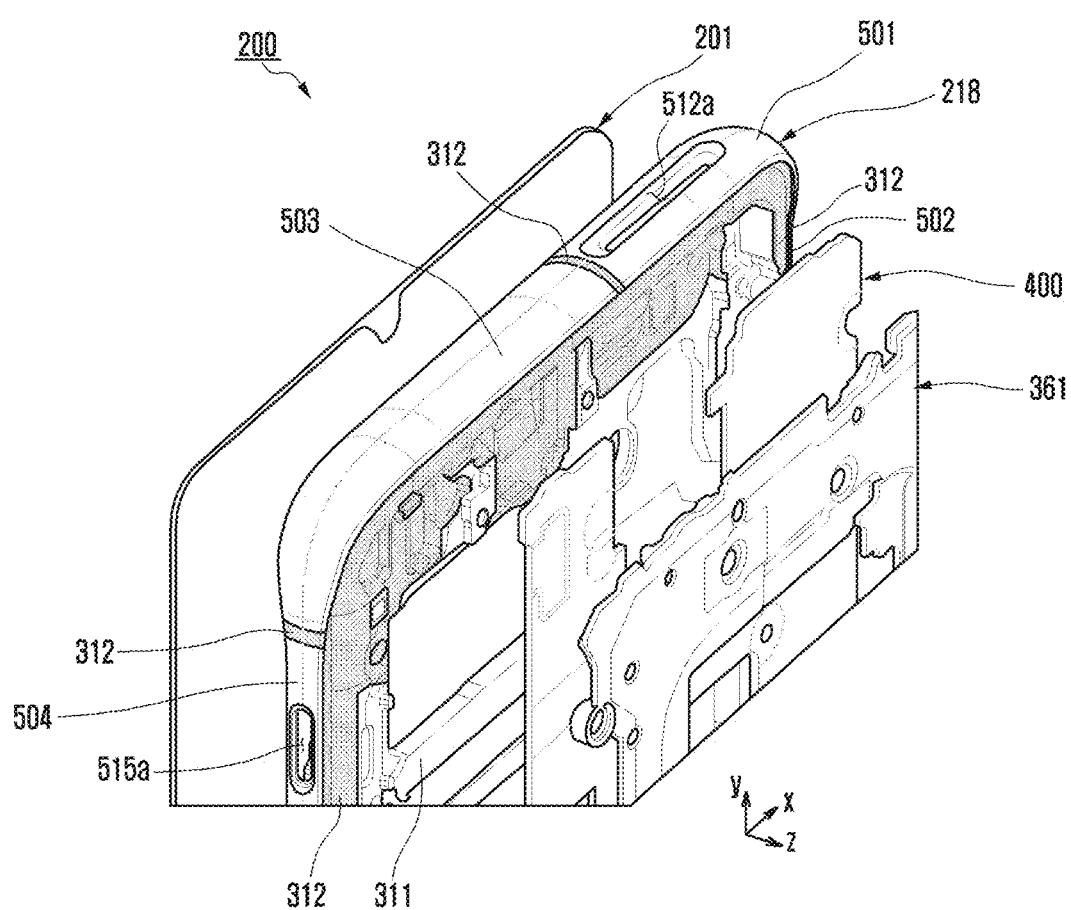
FIG. 4 is an exploded perspective view of the electronic device in FIG. 2A according to various embodiments.
Figure 5:
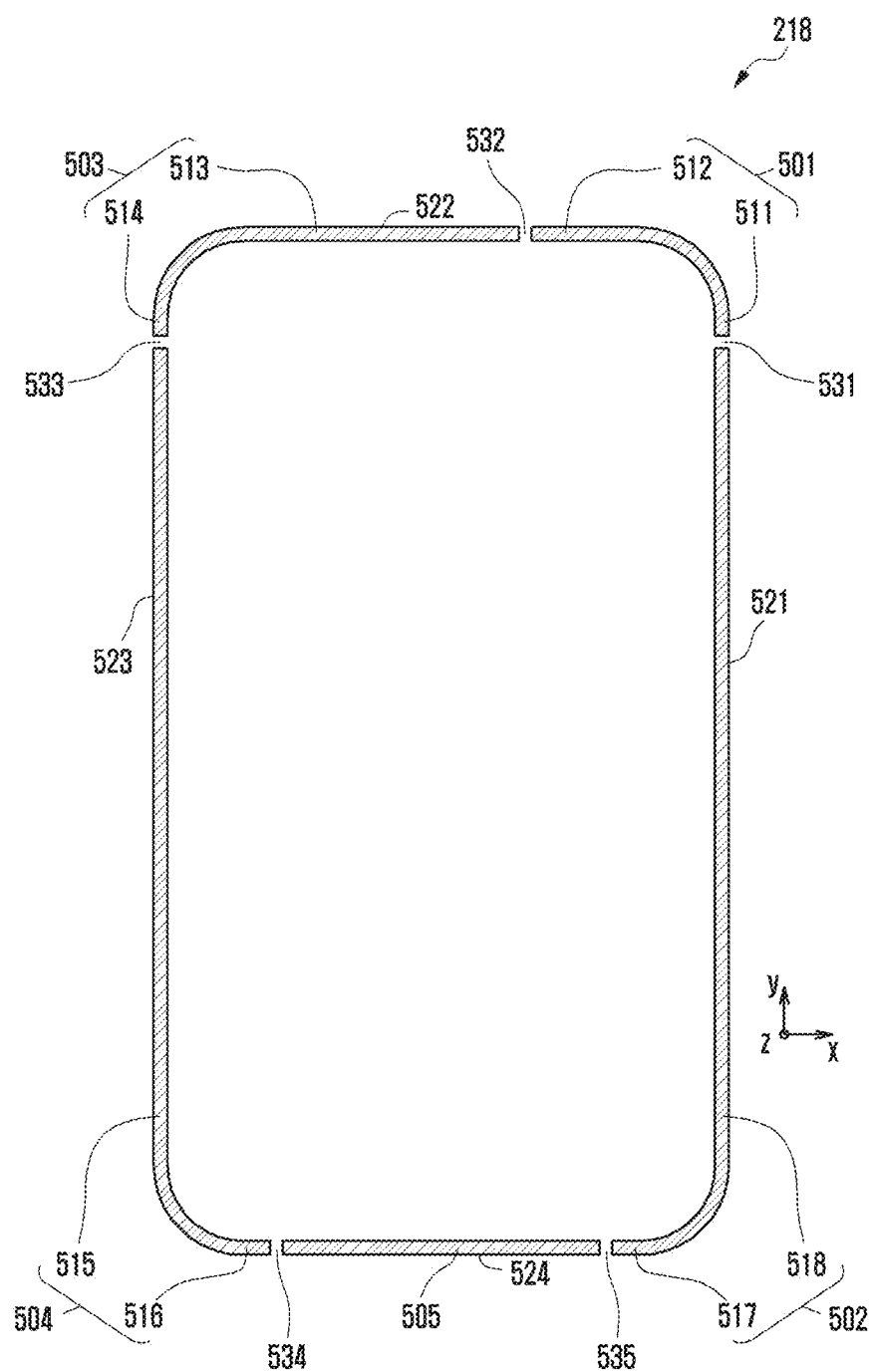
FIG. 5 is a diagram illustrating a side member (e.g., side bezel) according to various embodiments.

FIG. 4 is a partial exploded perspective view of the electronic device 200 in FIG. 2A according to various embodiments. FIG. 5 diagram illustrating a side member 218 according to various embodiments.

Referring to FIG. 4, in an embodiment, the electronic device 200 may include a side member 218, a first support member 311, a display 201, a printed circuit board 400, or a second support member 361. The printed circuit board 400 may be, for example, a first printed circuit board included in the first substrate assembly 341 in FIG. 3.

Referring to FIG. 5, the side member 218 may include, for example, a first side surface 521 facing in the +x-axis direction, a second side surface 522 facing in the +y-axis direction, a third side surface 523 facing in the −x-axis direction, or a fourth side surface 524 facing in the −y-axis direction. In an embodiment, the side member 218 may include a first conduction unit 501, a second conduction unit 502, a third conduction unit 503, a fourth conduction unit 504, or a fifth conduction unit 505. The side member 218 may include a first segment 531 between the first conduction unit 501 and the second conduction unit 502, a second segment 532 between the first conduction unit 501 and the third conduction unit 503, a third segment 533 between the third conduction unit 503 and the fourth conduction unit 504, a fourth segment 534 between the fourth conduction unit 504 and the fifth conduction unit 505, or a fifth segment 535 between the fifth conduction unit 505 and the second conduction unit 502. The first conduction unit 501 may include a first part 511 forming a portion of the first side surface 521 and a second part 512 forming a portion of the second side surface 522. The third conduction unit 503 may include a third part 513 forming a portion of the second side surface 522 and a fourth part 514 forming a portion of the third side surface 523. The fourth conduction unit 504 may include a fifth part 515 forming a portion of the third side surface 523 and a sixth part 516 forming a portion of the fourth side surface 524. The second conduction unit 502 may include a seventh part 517 forming a portion of the fourth side surface 524 and an eighth part 518 forming a portion of the first side surface 521. In an embodiment, a connected part between the first part 511 and the second part 512, a connected part between the third part 513 and the fourth part 514, a connected part between the fifth part 515 and the sixth part 516, or a connected part between the seventh part 517 and the eighth part 518 may be configured in the form of a curved corner or rounded corner. The example in which the side member 218 includes five conduction units and five segments are only an embodiment, and the disclosure is not limited thereto. For example, the side member 218 may include a plurality of conduction units and at least one segment.

Referring to FIG. 4, the first support member 311 may be positioned, for example, inside the electronic device 200 to be connected to the side member 218 or formed integrally with the side member 218. According to an embodiment, at least a portion of the first support member 311 and the side member 218 may be integrally formed. According to an embodiment, at least a portion of the first support member 311 and the side member 218 may be coupled. According to an embodiment, the first support member 311 and the side member 218 may include substantially the same metal material. According to an embodiment, the first support member 311 and the side member 218 may include different metal materials. According to an embodiment, the electronic device 200 may include a non-conductive member 312 disposed in the first support member 311. For example, the non-conductive member 312 may be disposed at the first segment 531, the second segment 532, the third segment 533, the fourth segment 534, or the fifth segment 535 of the side member 218 to form insulating parts 312. According to various embodiments, the first support member 311 may further include a non-conductive member 312.

In an embodiment, the fifth part 515 of the fourth conduction unit 504 may include an opening 515a for placing the key entry device 217 (see FIG. 2A). As another example, the second part 512 of the first conduction unit 501 may include an opening 512a for attaching and detaching a memory card.

In an embodiment, the first support member 311 may be positioned between the display 201 and the printed circuit board 400. For example, the display 210 may be disposed on one surface of the first support member 311, and the printed circuit board 400 may be disposed on the opposite surface of the first support member 311. In an embodiment, the printed circuit board 400 may be positioned between the first support member 311 and the second support member 361. In an embodiment, the second support member 361 may be positioned between the printed circuit board 400 and the rear plate 211 (see FIG. 2B or 3). In an embodiment, the printed circuit board 400 and/or the second support member 361 may be coupled to the first support member 311 through a bolt. For example, the first support member 311 may include a plurality of bosses (not shown) to be fastened with bolts, which are aligned with the bolt holes. The boss may be, for example, a bundle including a recess of a through hole having a thread or a nut capable of engaging with a bolt. In an embodiment, the printed circuit board 400 and/or the second support member 361 may include a plurality of bolt holes (not shown) aligned with the plurality of bosses.

According to an embodiment, at least a portion of the side member 218 may be utilized as an antenna radiator. At least a portion of the side member 218, as an antenna radiator, may be electrically connected to a wireless communication circuit (e.g., the wireless communication module 192 in FIG. 1) disposed on the printed circuit board 400. At least a portion of the side member 218, as an antenna radiator, may be electrically connected to the ground included in the printed circuit board 400.

According to an embodiment, the side member 218 and the first support member 311 may be formed of an integral conductive structure. The plurality of conduction units 501, 502, 503, 504, and 505 of the side member 217 may be electrically connected to the first support member 311.

Figure 6A:
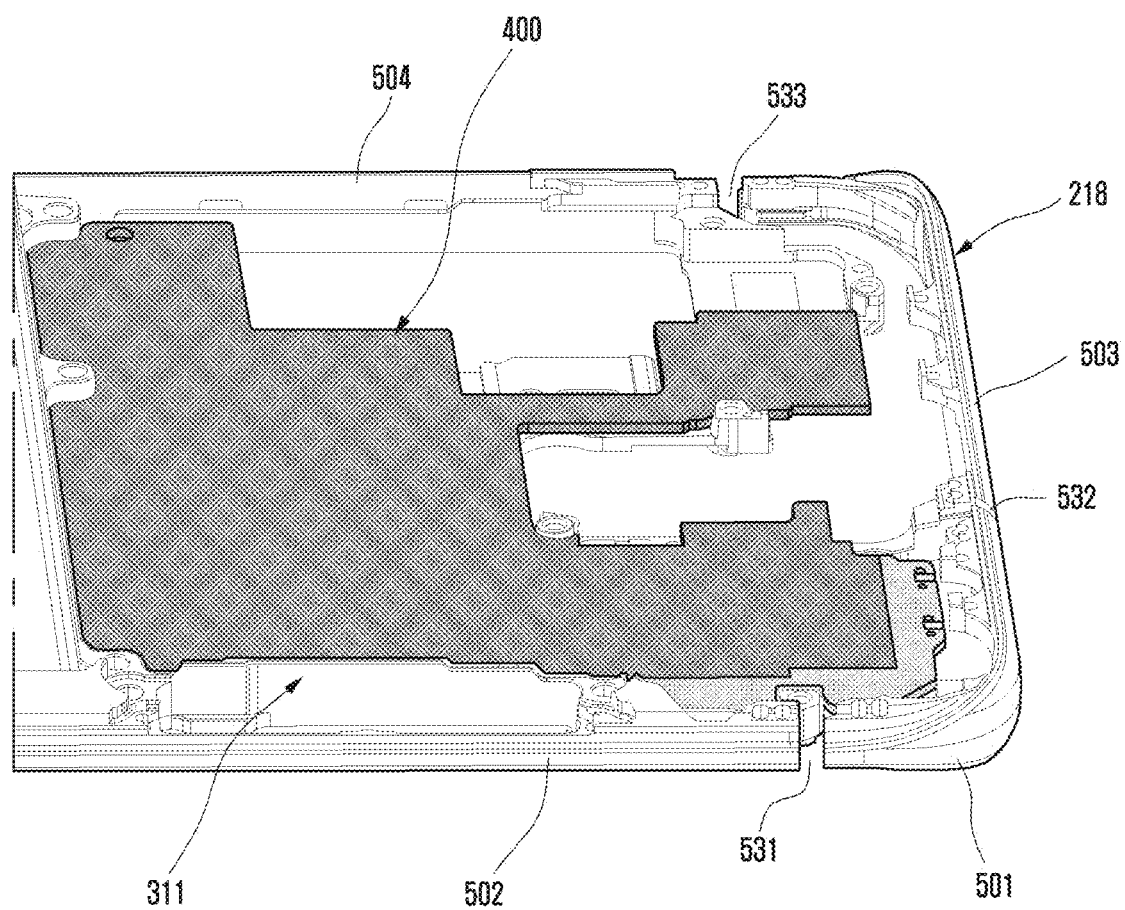
FIG. 6A is a perspective view illustrating a state in which a side member, a first support member, and a printed circuit board are connected according to various embodiments.
Figure 6B:
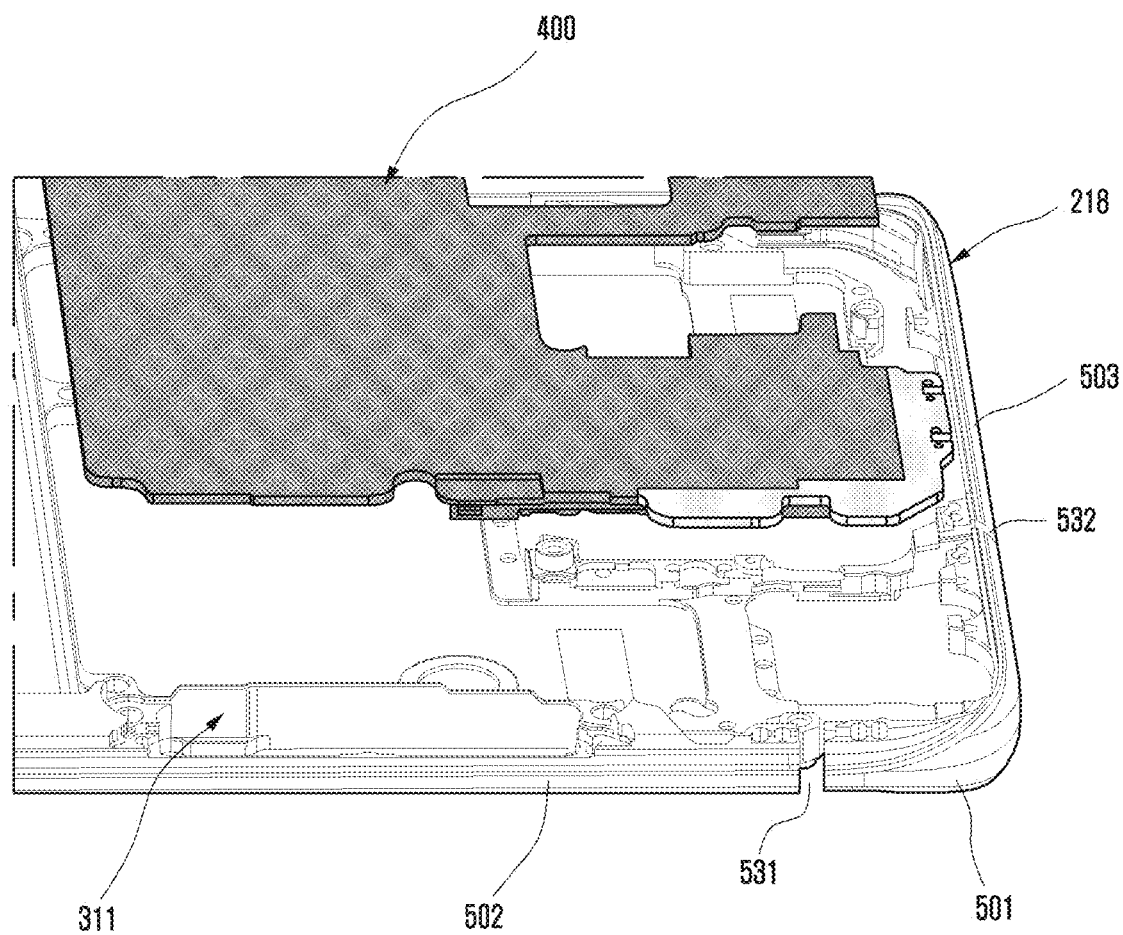
FIG. 6B is a perspective view illustrating a state in which a side member and a first support member are separated from a printed circuit board according to various embodiments.

FIG. 6A is a partial perspective view illustrating a state in which a side member 218, a first support member 311, and a printed circuit board 400 are connected according to various embodiments. FIG. 6B is a partial perspective view illustrating a state in which a side member 218 and a first support member 311 are separated from a printed circuit board 400 according to various embodiments.

Referring to FIGS. 5, 6A, and 6B, the side member 218 may include a plurality of conduction units 501, 502, 503, 504, and 505 separated by a plurality of segments 531, 532, 533, 534, and 535, and the plurality of conduction units 501, 502, 503, 504, and 505 may be connected to the first support member 311.

According to an embodiment, the printed circuit board 400 may be electrically connected to the first support member 311. For example, a flexible conductive member (not shown) may be positioned between the printed circuit board 400 and the first support member 311, and the first support member 311 may be electrically connected to the printed circuit board 400 through the flexible conductive member. The flexible conductive member may include, for example, a C-clip (e.g., a C-shaped spring), a pogo-pin, a spring, conductive Poron, conductive rubber, a conductive tape, or a copper connector. For example, the printed circuit board 400 and the first support member 311 may be coupled using a bolt, and the bolt may electrically connect the printed circuit board 400 and the first support member 311. The first support member 311 and the printed circuit board 400 may be electrically connected through various other methods.

According to an embodiment, at least a portion of the first support member 311 and the side member 218 may be utilized as an antenna radiator. The wireless communication circuit (e.g., the wireless communication module 192 in FIG. 1) positioned on the printed circuit board 400 may be electrically connected to at least one terminal formed in the first support member 311. The ground (e.g., a ground plane) included in the printed circuit board 400 may be electrically connected to at least one terminal formed in the first support member 311. The wireless communication circuit may provide a radiation current (or a wireless signal) to the first support member 311 and the side member 218, and a path through which the radiation current flows in the first support member 311 and the side member 218 and/or distribution of the radiation current may form an electromagnetic field capable of transmitting or receiving a signal in a corresponding frequency band. For example, referring to FIGS. 5 and 6A, the first conduction unit 501 and a partial area of the first support member 311 connected to the first conduction unit 501 may be used as an antenna radiator. The second conduction unit 502 and a partial area of the first support member 311 connected to the second conduction unit 502 may be used as an antenna radiator. The third conduction unit 503 and a partial area of the first support member 311 connected to the third conduction unit 503 may be used as an antenna radiator. The fourth conduction unit 504 and a partial area of the first support member 311 connected to the fourth conduction unit 504 may be used as an antenna radiator. The fifth conduction unit 505 and a partial area of the first support member 311 connected to the fifth conduction unit 505 may be used as an antenna radiator.

According to various embodiments, the wireless communication circuit (e.g., the wireless communication module 192 in FIG. 1) may process a transmission signal or a reception signal in at least one specified frequency band through at least a portion of the first support member 311 and the side member 218. For example, the specified frequency band may include at least one of a low band (LB) (about 600 MHz to about 1 GHz), a middle band (MB) (about 1 GHz to about 2.3 GHz), a high band (HB) (about 2.3 GHz to about 2.7 GHz), or an ultra-high band (UHB) (about 2.7 GHz to about 6 GHz). The specified frequency band may be various in addition thereto.

Figure 7:
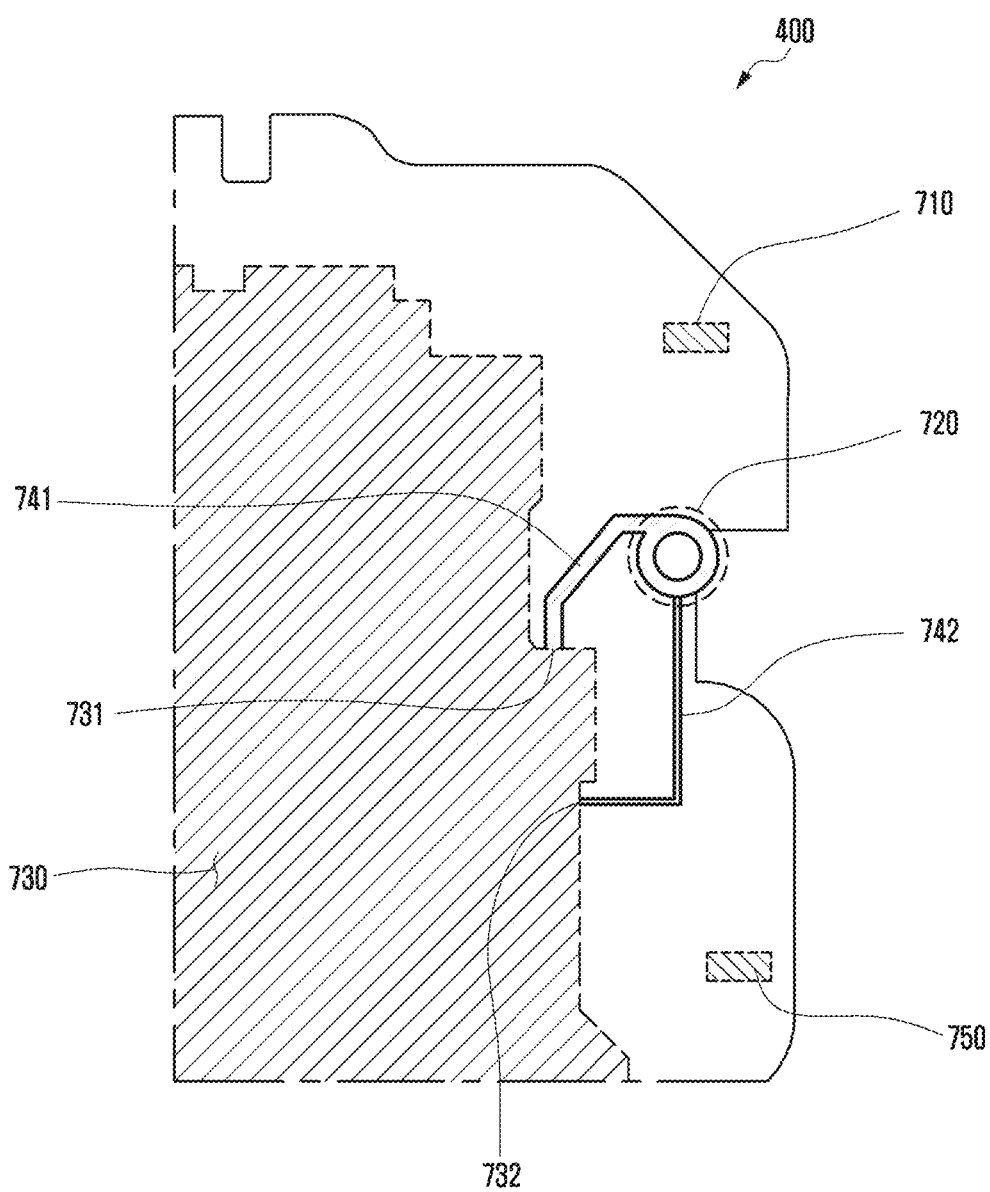
FIG. 7 is a diagram illustrating a part of the printed circuit board in FIG. 6A according to various embodiments.

FIG. 7 is a diagram illustrating a part of the printed circuit board 400 in FIG. 6A according to various embodiments.

Referring to FIG. 7, in an embodiment, the printed circuit board 400 may include a first terminal 710, a second terminal 720, a ground (or ground plane) 730, a first electrical path 741, or a second electrical path 742.

According to an embodiment, the first terminal 710 may be electrically connected to a wireless communication circuit (e.g., the wireless communication module 192 in FIG. 1) positioned on the printed circuit board 400. Although not shown, a transmission line connecting the first terminal 710 and the wireless communication circuit may be disposed on the printed circuit board 400. The first terminal 710 may be electrically connected to the wireless communication circuit through the transmission line and may be connected to an antenna radiator through a connecting member such as a C-clip, bolt, or FPCB to operate as a feeding structure. The transmission line is a structure for transmitting a signal (voltage or current) of a radio frequency (RF) through an antenna radiator (not shown) electrically connected to the first terminal 710, and may be defined as a conduction system using wave propagation by an electrical element (e.g., an element having resistance, inductance, conductance, or capacitance per unit length). The wireless communication circuit may supply a radiation current to the antenna radiator through the first terminal 710. For example, the transmission line may be formed on a layer different from the ground 730.

According to an embodiment, the second terminal 720 may be positioned to be spaced apart from the first terminal 710 and the ground 730. The first electrical path (or a first conductive pattern) 741 may electrically connect the second terminal 720 and a first position 731 of the ground 730. The second electrical path (or a second conductive pattern) 742 may electrically connect the second terminal 720 and a second position 732 of the ground 730.

According to an embodiment, the first electrical path 741 and the second electrical path 742 may be implemented in different forms. For example, the first electrical path 741 may have a first length extending from the second terminal 720 to the first position 731. The second electrical path 742 may have a second length extending from the second terminal 720 to the second position 732. The first length and the second length may be different from each other. As shown, the first length may be less than the second length. According to various embodiments, although not shown, the first electrical path 741 may be formed to be longer than the second electrical path 742.

According to various embodiments, the first electrical path 741 and the second electrical path 742 may be connected to one of the first position 731 and the second position 732.

According to an embodiment, the printed circuit board 400 may further include at least one terminal (e.g., a terminal 750), such as the first terminal 710, electrically connected to the wireless communication circuit. For example, the terminal 750 may be electrically connected to the wireless communication circuit through a transmission line, and may be connected to an antenna radiator through a connecting member such as a C-clip, bolt, or FPCB to operate as a feeding structure. According to an embodiment (not shown), the printed circuit board 400 may further include at least one terminal, such as the second terminal 720, electrically connected to the ground 730.

Figure 8:
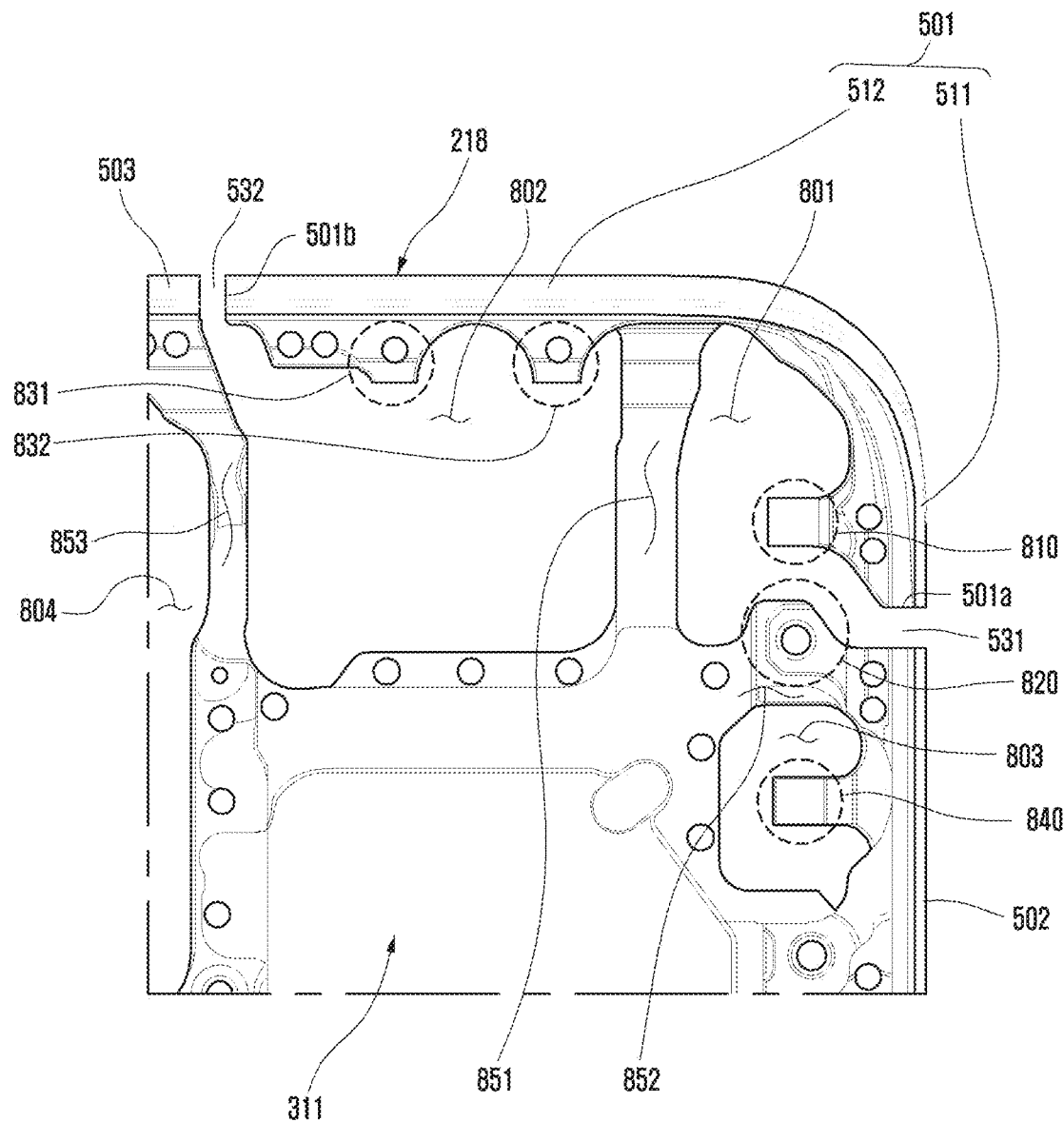
FIG. 8 is a diagram illustrating the side member and the first support member in FIG. 6A according to various embodiments.

FIG. 8 is a diagram illustrating a side member 218 and a first support member 311 according to various embodiments.

Referring to FIGS. 6A, 6B, and 8, for example, the first support member 311, when viewed from above of the printed circuit board 400, may include a first opening 801, a second opening 802, a third opening 803, or a fourth opening 804.

According to an embodiment, the first opening 801 or the second opening 802 may be positioned near the first conduction unit 501 of the side member 218. The first opening 801 may be configured, for example, in a form in which a partial empty space of the first support member 311 formed near the first conduction unit 501 from the first segment 531 is connected. As another example, the first opening 801 may be formed adjacent to a portion of the first conduction unit 501 to be used as an antenna radiator. In an embodiment, at least a portion of the first opening 801 may extend to the first segment 531. For example, at least a portion of the first opening 801 may be connected to the first segment 531 between the third terminal 810 and the fourth terminal 820 when viewed from above of the rear plate 211. The second opening 802 may be configured, for example, in a form in which a partial empty space of the first support member 311 formed near the first conduction unit 501 from the second segment 532 is connected. The first support member 311 may include a first extension 851 extending from the first conduction unit 501 between the first opening 801 and the second opening 802. One end 501a of the first conduction unit 501 may be positioned to be spaced apart from the second conduction unit 502 with the first segment 531 interposed therebetween. The opposite end 501b of the first conduction unit 502 may be positioned to be spaced apart from the third conduction unit 503 with the second segment 532 interposed therebetween. The first extension 851 may extend from the positioned between one end 501a and the opposite end 501b of the first conduction unit 501 (e.g., near the corner where the first part 511 and the second part 512 of the first conduction unit 501 are connected) between the first opening 801 and the second opening 802. In an embodiment, the first segment 531 or the second segment 532 may be filled with a non-conductive member (e.g., the non-conductive member 312 in FIG. 4).

According to an embodiment, at least a portion of the first opening 801, the second opening 802, the third opening 803, or the fourth opening 804 may be filled with a non-conductive member (e.g., the non-conductive member 312 in FIG. 4). In an embodiment, the non-conductive member filling the first segment 531 and the non-conductive member filling the first opening 801 may be connected.

According to an embodiment, the third opening 803 may be positioned near the second conduction unit 502 of the side member 218. The first support member 311 may include a second extension 852 extending from the second conduction unit 502 between the first opening 801 and the third opening 803. For example, the second extension 852 may extend from near the first segment 531 between the first opening 801 and the third opening 803. According to various embodiments, the third opening 803 may be omitted.

According to an embodiment, the fourth opening 804 may be positioned to be spaced apart from the first opening 801 with the second opening 802 interposed therebetween. The first support member 311 may include a third extension 853 extending from the third conduction unit 503 between the second opening 802 and the fourth opening 804. The third extension 853 may extend, for example, from near the second segment 532 between the second opening 802 and the fourth opening 804.

According to an embodiment, the wireless communication circuit (e.g., the wireless communication module 192 in FIG. 1) may transmit and/or receive a signal in a selected or specified frequency band through at least a portion of the first support member 311 and the side member 218 surrounding the first opening 801. The first support member 311 and the side member 218 at least partially surrounding the first opening 801 may operate as a loop-type antenna. According to various embodiments, a conductive structure including the first support member 311 and the side member 218 may include a first opening 801 (or a slot) and a first segment 531 (or a slit), and an antenna based on this may operate as a loop antenna, a slot antenna, a slit antenna, or an open slot antenna.

According to an embodiment, at least a portion of the first support member 311 surrounding the first opening 801 may include a third terminal 810 and a fourth terminal 820. The third terminal 810 may be electrically connected to the first terminal 710 of the printed circuit board 400 in FIG. 7. The fourth terminal 820 may be electrically connected to the second terminal 720 of the printed circuit board 400 in FIG. 7. According to an embodiment, the third terminal 810 may be electrically connected to the wireless communication circuit (e.g., the wireless communication module 192 in FIG. 1). The fourth terminal 820 may be electrically connected to the ground (e.g., the ground 730 in FIG. 7). According to an embodiment, the third terminal 810 or the fourth terminal 820 may be positioned near the first segment 531. The third terminal 810 or the fourth terminal 820 may be positioned closer to the first segment 531 than the second segment 532.

According to an embodiment, at least a portion of the first support member 311 surrounding the second opening 802 may include a fifth terminal 831 or a sixth terminal 832. The fifth terminal 831 or the sixth terminal 832 may be formed to protrude from the first conduction unit 501 toward the second opening 802. One of the fifth terminal 831 and the sixth terminal 832 may be electrically connected to the wireless communication circuit (e.g., the wireless communication module 192 in FIG. 1), and the remaining one thereof may be electrically connected to the ground (e.g., the ground 730 in FIG. 7). For example, the printed circuit board 400 in FIG. 7 may include a terminal (not shown) to be electrically connected to the fifth terminal 831, or a terminal (not shown) to be electrically connected to the sixth terminal 832.

According to an embodiment, at least a portion of the first support member 311 surrounding the third opening 803 may include a seventh terminal 840. The seventh terminal 840 may be formed to protrude from the second conduction unit 502 toward the third opening 803. The seventh terminal 840 may be electrically connected to the wireless communication circuit (e.g., the wireless communication module 192 in FIG. 1). For example, the terminal 750 positioned on the printed circuit board 400 in FIG. 7 may be electrically connected to the seventh terminal 840.

Figure 9:
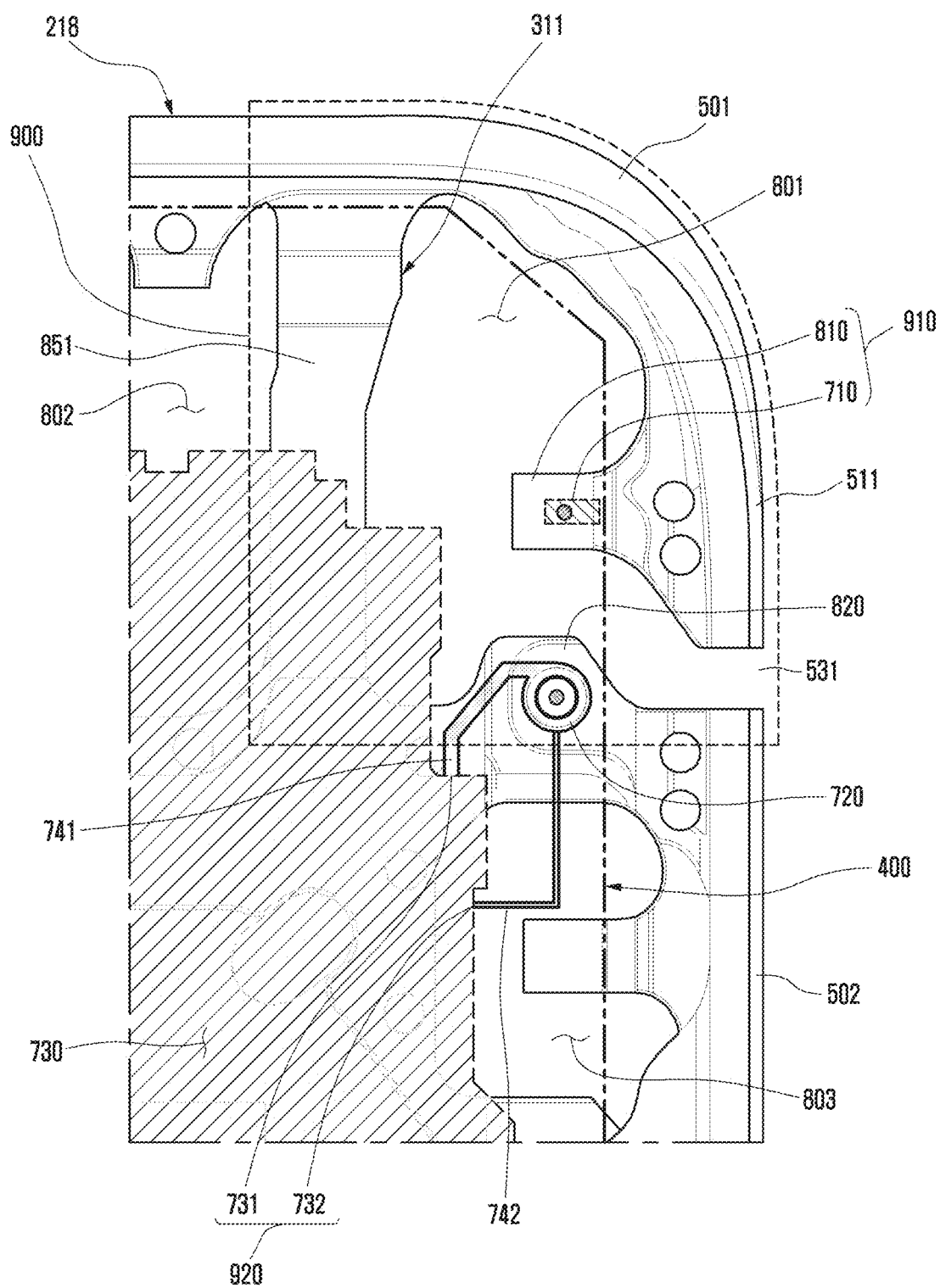
FIG. 9 is a diagram illustrating the printed circuit board in FIG. 7, and the side member and the first support member in FIG. 8 according to various embodiments.

FIG. 9 is a diagram illustrating the printed circuit board 400 in FIG. 7, and the side member 218 and the first support member 311 in FIG. 8 according to various embodiments. For example, FIG. 9 may be a plan view showing the state in which the printed circuit board 400 is disposed on the first support member 311 by partially penetrating the same.

Referring to FIG. 9, the first terminal 710 of the printed circuit board 400 be electrically connected to the third terminal 810 of the first support member 311 positioned near the first opening 801. The second terminal 720 of the printed circuit board 400 may be electrically connected to the fourth terminal 820 of the first support member 311 positioned near the first opening 801.

According to an embodiment, the third terminal 810 may be formed to protrude from the first portion 511 of the first conduction unit 501. For example, the third terminal 810 may protrude toward the first extension 851. According to an embodiment, the first terminal 710 and the third terminal 810 electrically connected to the first terminal 710 indicate a structure for providing radiate current to the first conductive area 900 surrounding the first opening 801 and may be referred to as a feeding structure 910. For example, the first conductive area 900 may include a portion of the first support member 311 surrounding the first opening 801 and a portion of the side member 218 surrounding the first opening 801.

According to an embodiment, if the printed circuit board 400 (see FIG. 4, 6A, or 6B) is coupled to the first support member 311, the third terminal 810 may come into physical contact with a flexible conductive member such as a C-clip, a pogo pin, a spring, conductive Poron, conductive rubber, a conductive tape, or a cooper connector disposed on the first terminal 710 to be electrically connected to the first terminal 710. The position or shape of the third terminal 810, not limited to the illustrated embodiment, may vary, and may be electrically connected to the first terminal 710 through various other methods. The feeding structure 910 may be defined by further including, for example, a flexible conductive member between the first terminal 710 and the third terminal 810.

According to an embodiment, the fourth terminal 820 may be positioned on the second extension 852. For example, a bolt may physically and electrically connect the second extension 852 and the printed circuit board 400. The fourth terminal 820 may include a boss for bolting, and the printed circuit board 400 may include a bolt-fastening part (not shown) corresponding to the boss. The bolt-fastening part may be implemented to include the second terminal 720. The position or shape of the fourth terminal 820, not limited to the illustrated embodiment, may vary, and may be electrically connected to the second terminal 720 through various other methods.

According to an embodiment, when a radiation current is supplied through the feeding structure 910, a first conductive area 900 including the first opening 801, a first electrical path 741, and a second electrical path 742 may operate as an antenna structure capable of transmitting and/or receiving radio waves. The first conductive area 900 may include a conductive path or a conductive pattern between the third terminal 810 and the fourth terminal 820. A first position 731 of the ground 730 to which the first electrical path 741 is connected and/or a second position 732 of the ground 730 to which the second electrical path 742 is connected may operate as a grounding portion 920.

According to an embodiment, the printed circuit board 400 may include a non-conductive area (not shown) (e.g., a fill-cut area) that at least partially overlaps the first opening 801. For example, the ground 730 may not extend to the non-conductive area. The non-conductive area at least partially overlapping the first opening 801 may reduce the electromagnetic influence on the antenna structure including the first conductive area 900 including the first opening 801, the first electrical path 741, and the second electrical path 742, thereby reducing degradation of radiation performance of an antenna including the antenna structure.

According to an embodiment, the second electrical path 742 may strengthen a ground connection between the second terminal 720 and the ground 730. The second electrical path 742 may connect the second terminal 720 and the ground 730 so that the ground 730 of the printed circuit board 400 works better as an antenna ground.

According to various embodiments, the second electrical path 742 may be included in a circuit that protects internal circuits from external electric shock. For example, the external electric shock may be static electricity introduced due to electrostatic discharge (ESD), and the second electrical path 742 may be electrically connected to a device, such as a varistor, capable of absorbing static electricity.

According to various embodiments, the second electrical path 742 may be utilized a ground connection path of an antenna using the third opening 803 (e.g., an antenna implemented by the second conduction unit 502 and a portion of the first support member 311 connected thereto).

Figure 10:
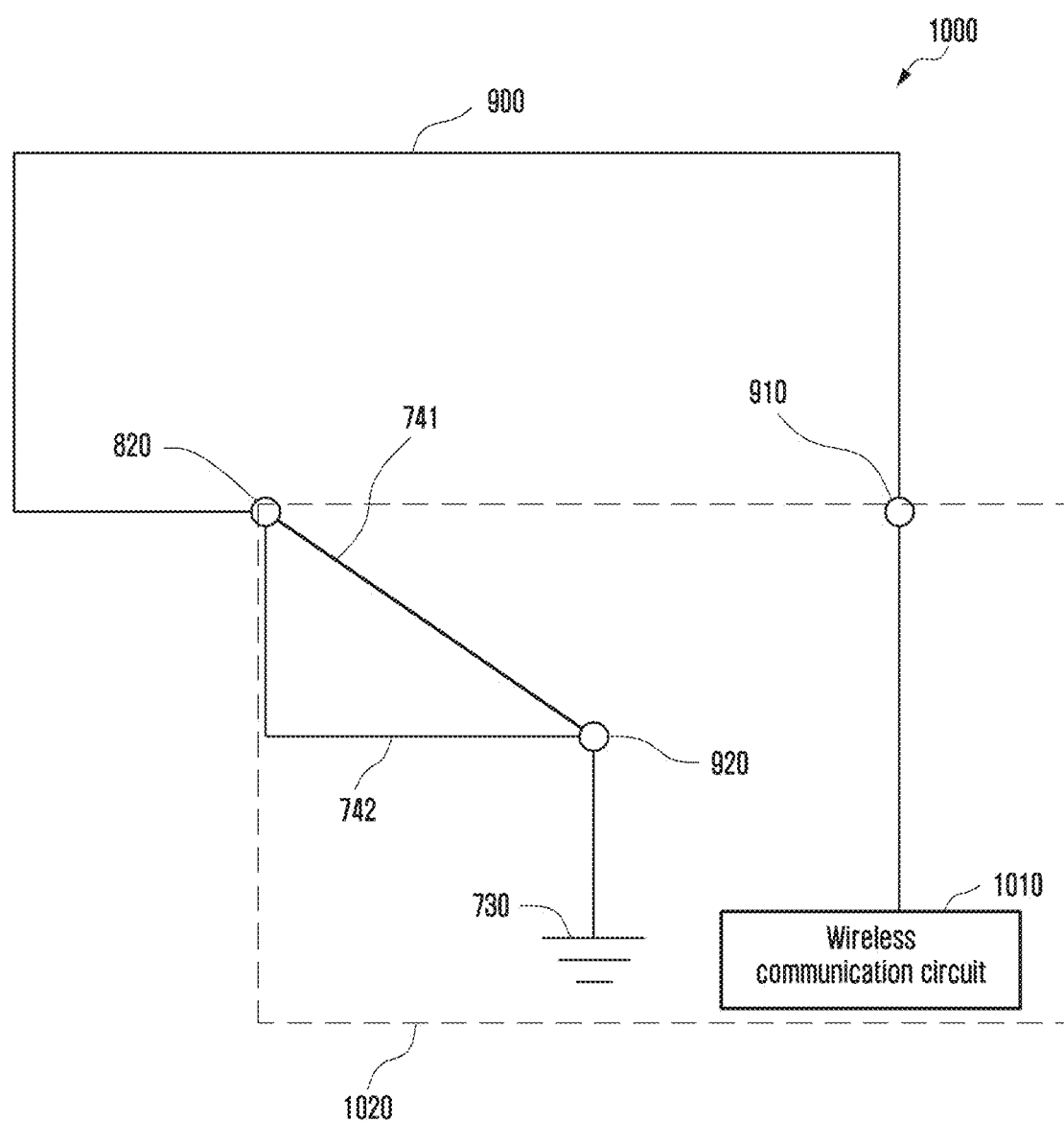
FIG. 10 is a circuit diagram illustrating an example antenna system according to various embodiments.
Figure 11:
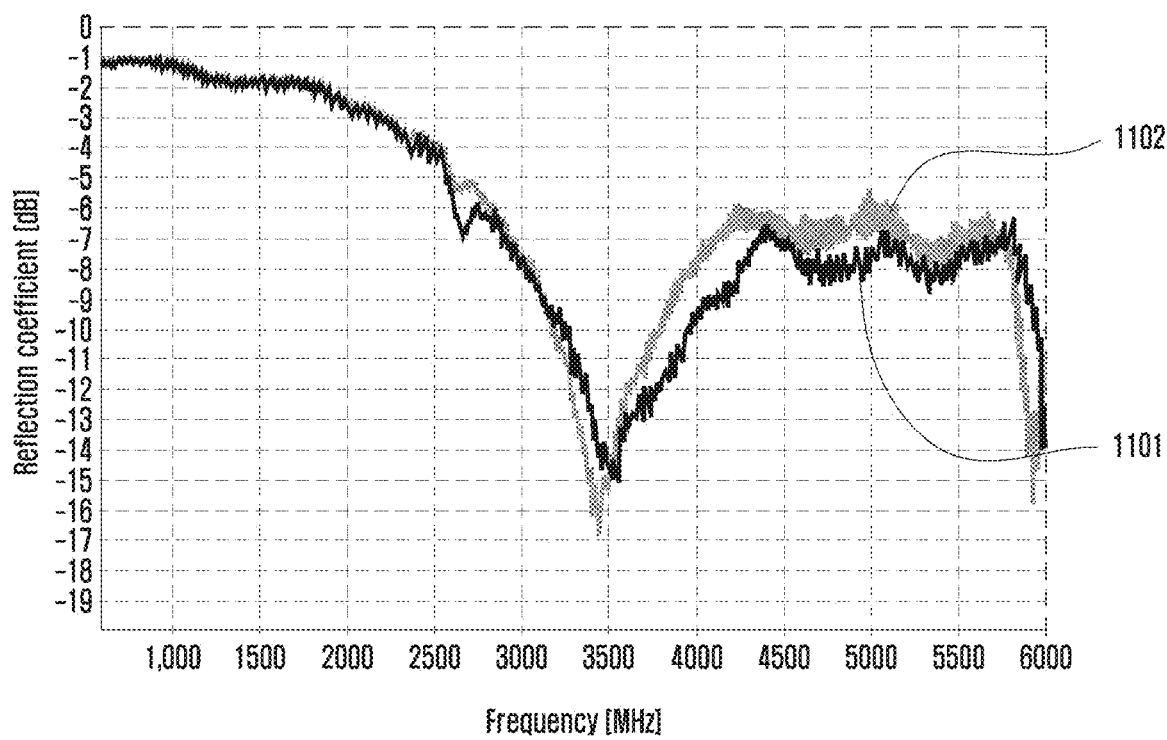
FIG. 11 is a graph illustrating a reflection coefficient in a frequency distribution of the antenna system in FIG. 10 according to various embodiments.
Figure 12:
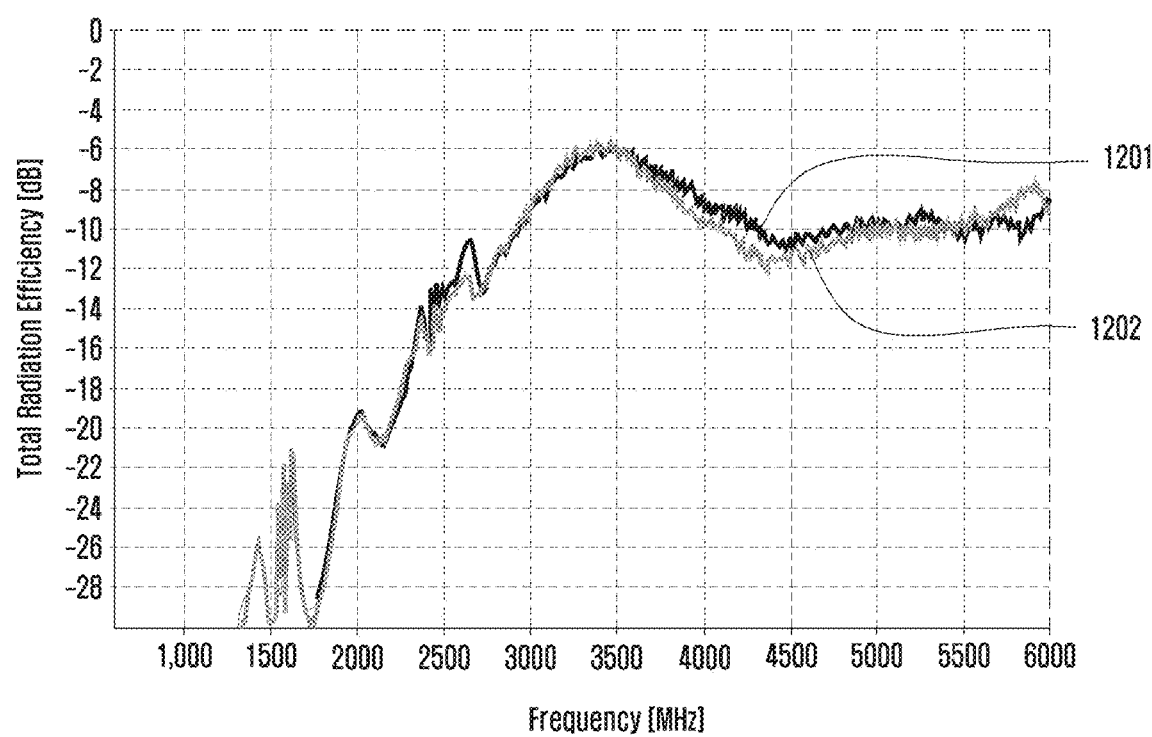
FIG. 12 is a graph illustrating radiation efficiency in a frequency distribution of the antenna system in FIG. 10 according to various embodiments.

FIG. 10 is a circuit diagram of an antenna system 1000 according to various embodiments. FIG. 11 is a graph illustrating a reflection coefficient in a frequency distribution of the antenna system 1000 in FIG. 10 according to various embodiments. FIG. 12 is a graph illustrating radiation efficiency in a frequency distribution of the antenna system 1000 in FIG. 10 according to various embodiments.

Referring to FIGS. 9 and 10, according to an embodiment, the antenna system 1000 may include a first conductive area 900, a feeding structure 910, a wireless communication circuit 1010, a grounding portion 920, a ground 930, a first electrical path 741, or a second electrical path 742. In an embodiment, the first conductive area 900 may be implemented by the side member 218 and the first support member 311 in FIG. 8. A circuit 1020 including the wireless communication circuit 1010, the first electrical path 741, the second electrical path 742, and/or the ground 730 may be disposed on the printed circuit board 400.

According to an embodiment, if the wireless communication circuit 1010 (e.g., the wireless communication module 192 in FIG. 1) supplies a radiation current to the feeding structure 910, the first conductive area 900, the first electrical path 741, and the second electrical path 742 may form a signal path between the feeding structure 910 and the grounding portion 920. The antenna system 1000 may form an electrical path (e.g., a length expressed as a ratio of wavelengths) of the antenna through the feeding structure 910 and the grounding portion 920, thereby operating as an antenna having a resonance frequency corresponding to the electrical path. According to an embodiment, the first electrical path 741 or the second electrical path 742 may be connected in series with the first conductive area 900 to form an electrical path of the antenna.

Referring to FIG. 11, reference numeral 1101 denotes a reflection coefficient in the frequency distribution of the antenna system 1000 in FIG. 10. Reference numeral 1102 denotes a reflection coefficient in the frequency distribution for an embodiment in which the first electrical path 741 is omitted from the antenna system 1000 in FIG. 10. According to an embodiment, the first electrical path 741 may shift the resonant frequency of the antenna system 1000 to a specified frequency or by a specified amount. For example, referring to reference numerals 1101 and 1102, due to the first electrical path 741, the resonant frequency of the antenna system 1000 may be shifted from about 3.2 GHz to about 3.3 GHz.

Referring to FIG. 12, reference numeral 1201 denotes radiation efficiency in the frequency distribution of the antenna system 1000 in FIG. 10. Reference numeral 1202 denotes radiation efficiency in the frequency distribution for the embodiment in which the first electrical path 741 is omitted from the antenna system 1000 in FIG. 10. According to an embodiment, the first electrical path 741 may shift the resonant frequency of the antenna system 1000 to a specified frequency or by a specified amount. For example, referring to reference numerals 1201 and 1202, due to the first electrical path 741, the radiation efficiency of the antenna system 1000 may be improved in a band of about 3.2 GHz to about 5 GHz.

Referring to FIGS. 9 and 10, in an embodiment, addition of the first electrical path 741 may change the signal path, thereby adjusting the resonant frequency of the antenna system 1000. According to an embodiment, addition of the first electrical path 741 may change the electrical path of the radiation current, thereby adjusting the resonant frequency of the antenna system 1000.

Referring to FIGS. 9 and 10, in an embodiment, the antenna system 1000 may include a structure (e.g., a slot antenna) that supplies power to the first opening 801 of the first conductive area 900 to radiate radio waves. When the wireless communication circuit 1010 supplies a radiation current to the feeding structure 910, electromagnetic coupling between the feeding structure 910, which is a point having the maximum radiation current, and the third terminal 820 near the feeding structure 910 may cause the first conductive area 900 including the first opening 801 to radiate. The feeding structure 910 is a structure for providing a radiation current to the first conductive area 900, and may include, for example, the first terminal 710 of the printed circuit board 400 and the third terminal 810 of the first support member 311 electrically connected to the first terminal 710. An electrical path (e.g., a length expressed as a ratio of wavelengths) of the first opening (or slot) 801 may have a substantial effect on the frequency characteristics of the antenna system 1000. According to an embodiment, the electrical path of the first opening 801 or the electrical structure of the first opening 801 may vary due to the addition of the first electrical path 741.

In various embodiments (not shown), the antenna system 1000 in FIG. 10 may further include a frequency control circuit (e.g., a tuner or a passive device) that is positioned on the printed circuit board 400 in FIG. 7 and is electrically connected to the first electrical path 741.

According to various embodiments, the antenna system 1000 may process a transmission signal or a reception signal in at least one specified frequency band. For example, the specified frequency band may include at least one of a low band (LB) (about 600 MHz to about 1 GHz), a middle band (MB) (about 1 GHz to about 2.3 GHz), a high band (HB) (about 2.3 GHz to about 2.7 GHz), or an ultra-high band (UHB) (about 2.7 GHz to about 6 GHz). The antenna system 1000 may be implemented to transmit or receive frequency signals in various other bands.

Figure 13:
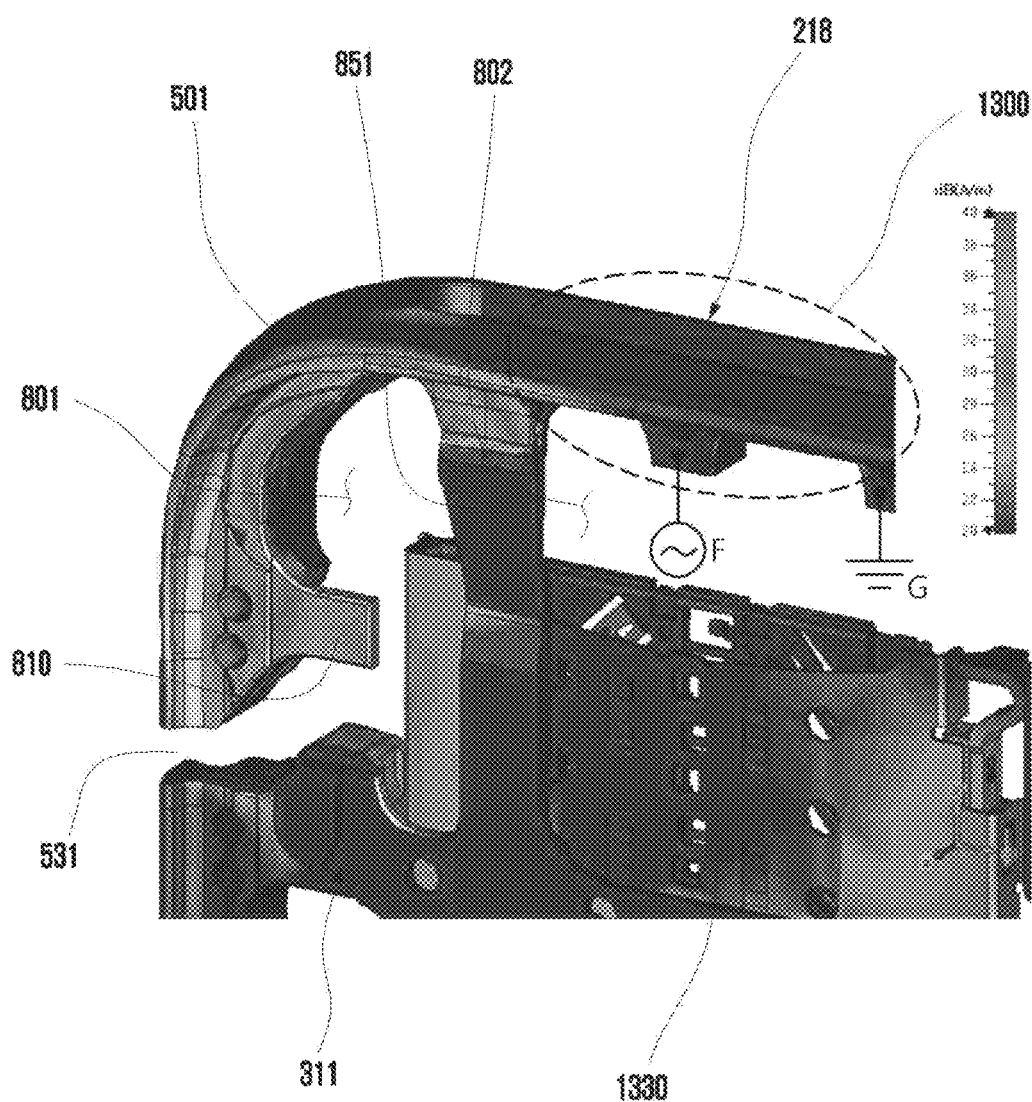
FIG. 13 is a diagram illustrating electric field distribution of a side member and a first support member during power feeding in the antenna system in FIG. 10 according to various embodiments.

FIG. 13 illustrates electric field distribution of a side member 218 and a first support member 311 during power feeding in the antenna system 1000 in FIG. 10 according to various embodiments.

Referring to FIG. 13, in an embodiment, a second antenna structure 1300 including a portion of the first conduction unit 501 near the second opening 802 and a portion of the first support member 311 connected thereto may be electrically connected to a feeding structure F. The wireless communication circuit (e.g., the wireless communication module 192 in FIG. 1) may provide a radiation current to the second antenna structure 1300 through the feeding structure F. The second antenna structure 1300 may be electrically connected to the ground G (e.g., the ground 730 in FIG. 7). For example, the second antenna structure 1300 may be electrically connected to the wireless communication circuit through one of the fifth terminal 831 or the sixth terminal 832 in FIG. 8 and may be electrically connected to the ground through the remaining one thereof. According to an embodiment, the second antenna structure 1300 may operate as an inverted F antenna (IFA).

Figure 14:
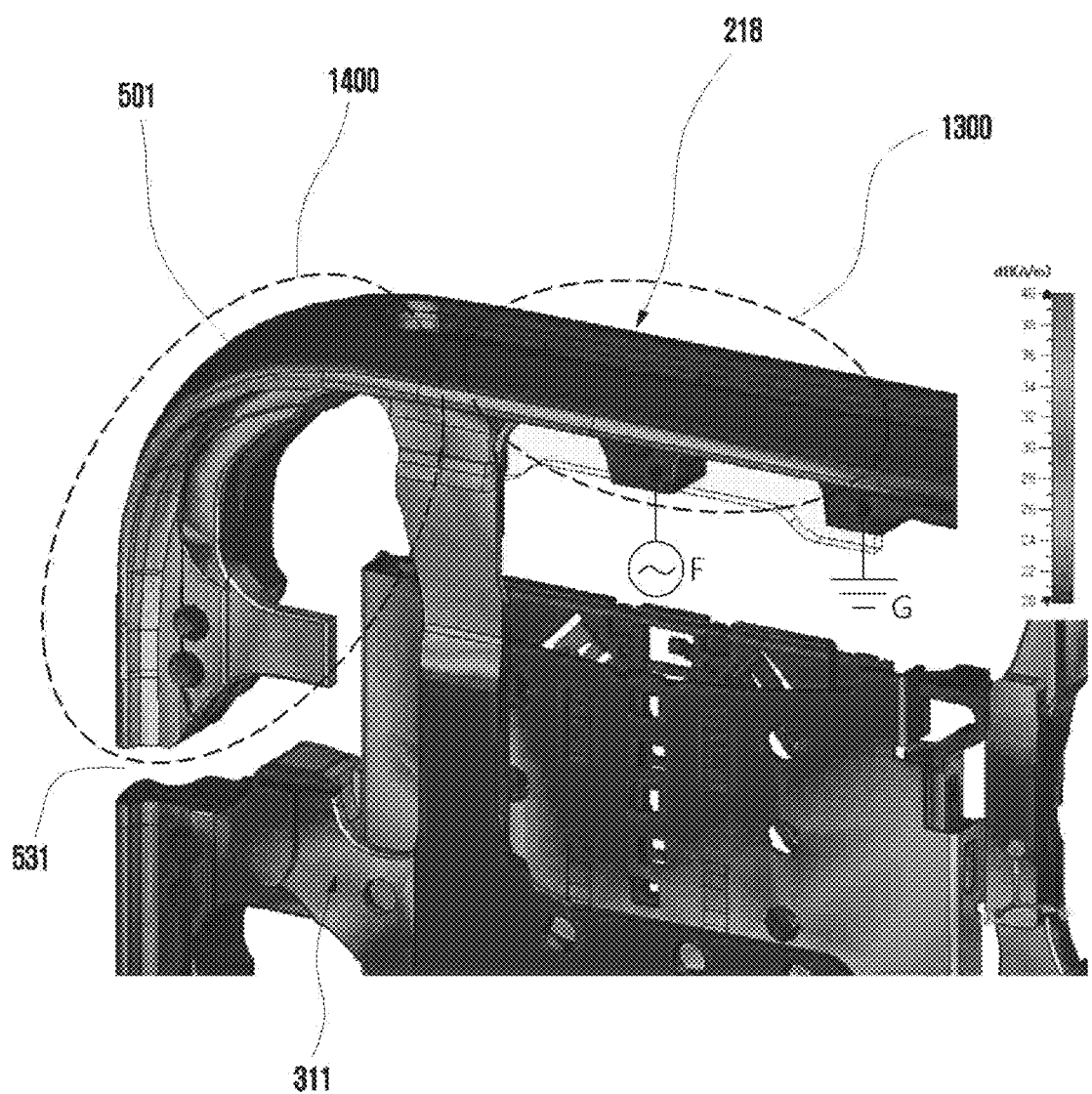
FIG. 14 is a diagram illustrating electric field distribution of a side member and a first support member in the case where an antenna structure including a portion of a fifth conduction unit near a first opening and a portion of a first support member connected thereto is implemented as an IFA according to various embodiments.

FIG. 14 illustrates electric field distribution of a side member 218 and a first support member 311 in the case where an antenna structure 1400 including a portion of a first conduction unit 501 near a first opening 801 and a portion of a first support member 311 connected thereto is implemented as an IFA according to an embodiment. Referring to the magnetic field distributions shown in FIGS. 13 and 14, the antenna system 1000 in FIG. 10 utilizing the first opening 801 may reduce the electrical influence on the antenna system including a second antenna structure 1300, compared to the embodiment in FIG. 14. The embodiment in FIG. 13, compared to the embodiment in FIG. 14, may improve isolation between the antenna system 1000 in FIG. 10 and an antenna system including the second antenna structure 1300. As illustrated, it can be seen that the second antenna structure 1300 exhibits a more electric field distribution in FIG. 14 than in FIG. 13. This may indicate that the antenna system 1000 in FIG. 10 according to the embodiment in FIG. 13 has higher isolation from the second antenna structure 1300.

Referring to FIGS. 5 and 6A, in various embodiments, the second conduction unit 502 and a partial area of the first support member 311 connected to the second conduction unit 502 may be utilized as a third antenna structure (not shown). For example, the third antenna structure may be electrically connected to the wireless communication circuit through the seventh terminal 840 in FIG. 8. According to an embodiment, the antenna system 1000 in FIG. 10 may improve isolation from the antenna system including the third antenna structure.

Referring to FIG. 13, in various embodiments, the sim socket 1330 positioned on the printed circuit board 400 in FIG. 4 may be positioned to at least partially overlap the first support member 311. According to an embodiment, the sim socket 1330 may include a conductive material and have an electromagnetic effect on the antenna system 1000 in FIG. 10.

Figure 15:
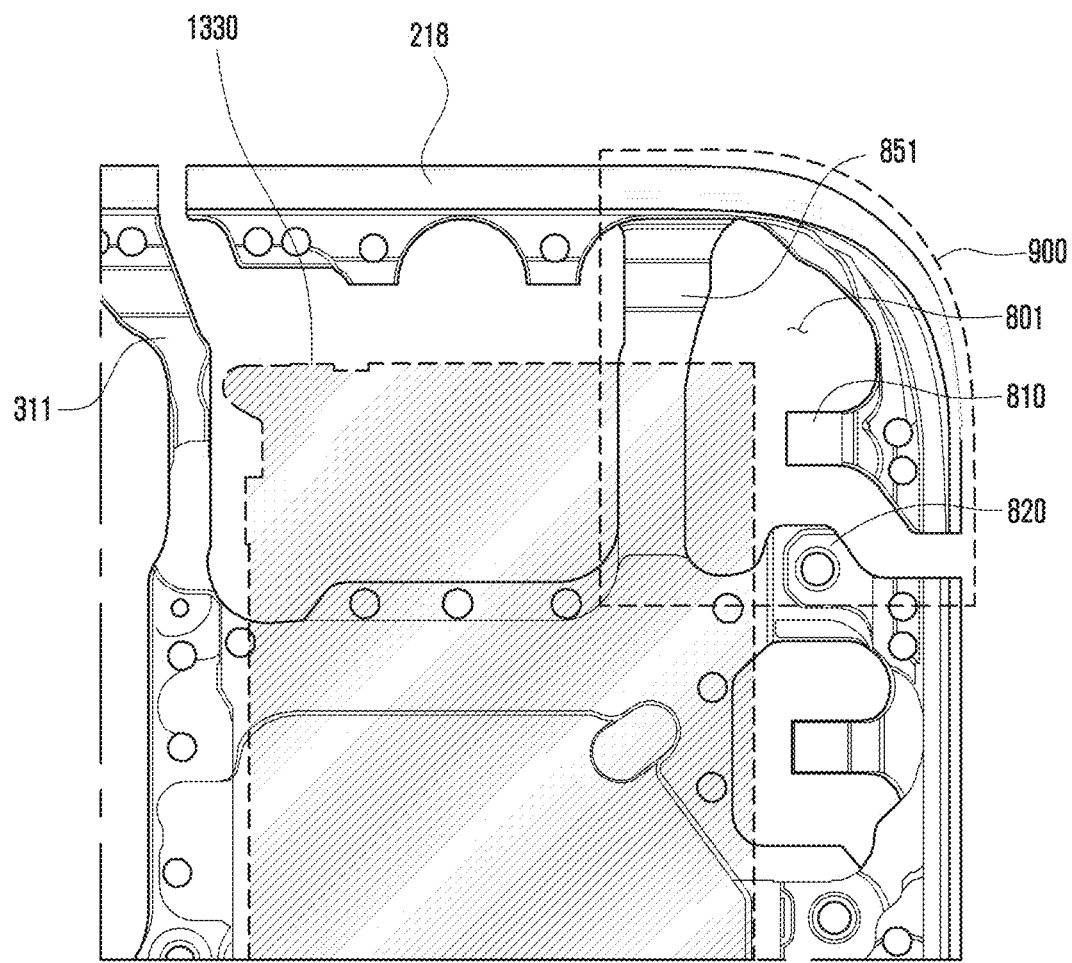
FIG. 15 is a diagram illustrating a side member and a first support member according to various embodiments.

FIG. 15 is a diagram illustrating a side member 218 and a first support member 311 according to various embodiments.

Referring to FIG. 15, in an embodiment, the sim socket 1330 positioned on the printed circuit board 400 in FIG. 4 may partially overlap the first conductive area 900 included in the antenna system 1000 in FIG. 10 when viewed from above of the rear plate 211. For example, the sim socket 1330 may at least partially overlap the first extension 851. According to an embodiment, the sim socket 1330 may overlap the first opening 801 of the first conductive area 900, thereby affecting the resonance frequency of the antenna system 1000 in FIG. 10. For example, when a radiation signal flows through the first conductive area 900, a portion of the radiation signal may be induced to the sim socket 1330 through the first extension 851. This may change the current distribution so that the resonance frequency of the antenna system 1000 in FIG. 10 may be shifted to a specified frequency or by a specified amount. According to an embodiment, when viewed from above of the rear plate 211, the sim socket 1330 may not overlap the third terminal 810 (or the feeding structure 910 in FIG. 9). Accordingly, electromagnetic coupling between the third terminal 810 and the sim socket 1330 may be reduced. According to various embodiments, the sim socket 1330 may not overlap the fourth terminal 820.

According to various embodiments, not limited to the sim socket 1330, various conductive members may have an electromagnetic effect on the antenna system 1000 in FIG. 10. For example, the ground 730 positioned on the printed circuit board 400 in FIG. 7 may partially overlap the first conductive area 900, so that the resonance frequency of the antenna system 1000 in FIG. 10 may be adjusted.

Figure 16:
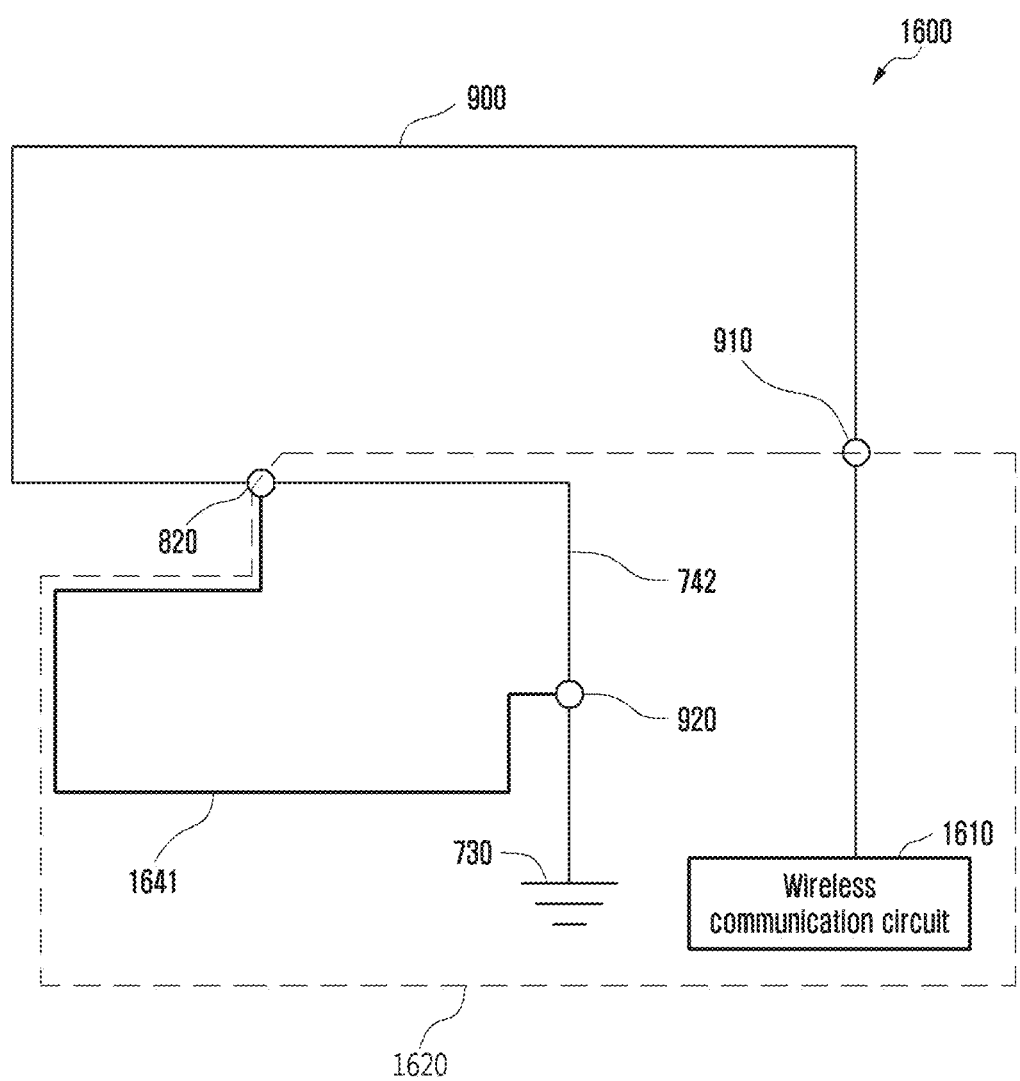
FIG. 16 is a circuit diagram of an antenna system according to various embodiments.

FIG. 16 is a circuit diagram of an antenna system 1600 according to various embodiments.

Referring to FIG. 16, in an embodiment, the antenna system 1600 may include a first conductive area 900, a feeding structure 910, a wireless communication circuit 1610 (e.g., the wireless communication module 192 in FIG. 1), a grounding portion 920, a ground 930, a first electrical path 1641, or a second electrical path 742. In an embodiment, the first conductive area 900 may be implemented by the side member 218 and the first support member 311 in FIG. 8. A circuit 1620 including the wireless communication circuit 1610, the first electrical path 1641, the second electrical path 742, and the ground 730 may be disposed on the printed circuit board 400 in FIG. 7.

According to an embodiment, when the wireless communication circuit 1610 (e.g., the wireless communication module 192 in FIG. 1) supplies a radiation current to the feeding structure 910, the first conductive area 900, the first electrical path 1641, and the second electrical path 742 may form a signal path between the feeding structure 910 and the grounding portion 920. According to an embodiment, the antenna system 1600 may form an electrical path of the antenna through the feeding structure 910 and the grounding portion 920, thereby operating as an antenna having a resonance frequency corresponding to the electrical path. According to an embodiment, the first electrical path 1641 or the second electrical path 742 may be connected in series with the first conductive area 900 to form an electrical path of the antenna.

According to an embodiment, the first electrical path 1641 may have a length greater than the second electrical path 742. Accordingly, the antenna system 1000 in FIG. 16 may have a lower resonance frequency, compared to the embodiment in FIG. 10. The electrical path of the antenna of the antenna system 1600 according to the embodiment in FIG. 16 may be longer than that of the embodiment in FIG. 10. This may contribute to ground reinforcement by providing multiple electrical lengths.

Figure 17:
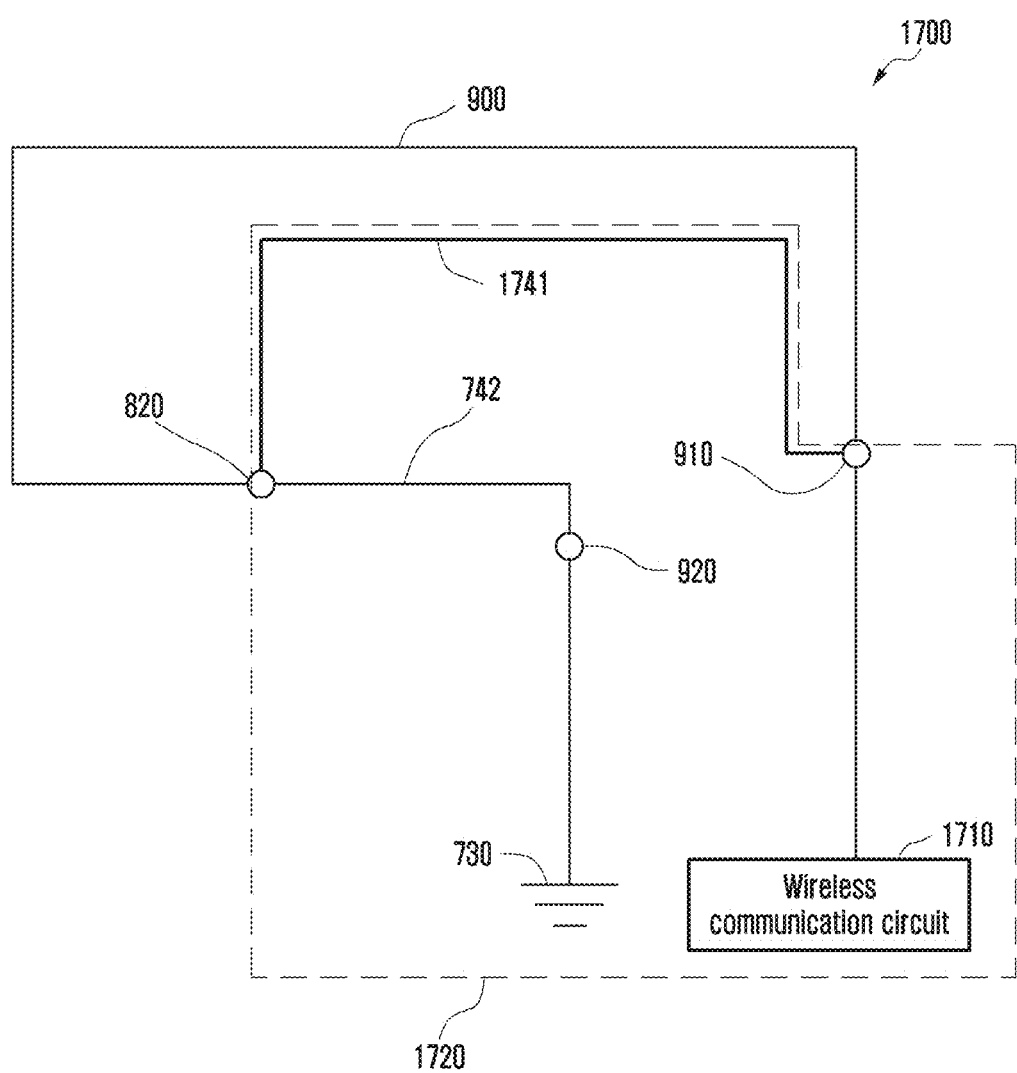
FIG. 17 is a circuit diagram of an antenna system according to various embodiments.

FIG. 17 is a circuit diagram of an antenna system 1700 according to various embodiments.

Referring to FIG. 17, in an embodiment, the antenna system 1700 may include a first conductive area 900, a feeding structure 910, a wireless communication circuit 1710 (e.g., the wireless communication circuit 192 in FIG. 1), a grounding portion 920, a ground 730, a first electrical path 1741, or a second electrical path 742. The first conductive area 900 may include at least a portion of the side member 218 and the first support member 311 in FIG. 8. A circuit 1720 including the wireless communication circuit 1710, the first electrical path 1741, the second electrical path 742, and the ground 730 may be disposed on the printed circuit board 400 in FIG. 7.

According to an embodiment, when the wireless communication circuit 1710 (e.g., the wireless communication module 192 in FIG. 1) supplies a radiation current to the feeding structure 910, the first conductive area 900, the first electrical path 1741, and the second electrical path 742 may form a signal path between the feeding structure 910 and the grounding portion 920. According to an embodiment, the antenna system 1700 may form an electrical path of the antenna through the feeding structure 910 and the grounding portion 920, thereby operating as an antenna having a resonance frequency corresponding to the electrical path. According to an embodiment, the first electrical path 1741 may overlap a first opening (e.g., the first opening 801 in FIG. 15) of the first conductive area 900, and thus the antenna system 1700 may form a plurality of signal paths. For example, the antenna system 1700 may implement a parallel signal path structure including a first signal path leading to the feeding structure 910, the first conductive area 900, the fourth terminal 820, the grounding portion 920, and the ground 730, and a second signal path leading to the feeding structure 910, the first electrical path 1641, the fourth terminal 820, the grounding portion 920, and the ground 730.

According to various embodiments (not shown), an antenna system including both the first electrical path 1641 according to the embodiment in FIG. 16 and the first electrical path 1741 according to the embodiment in FIG. 17 may be implemented.

Figure 18:
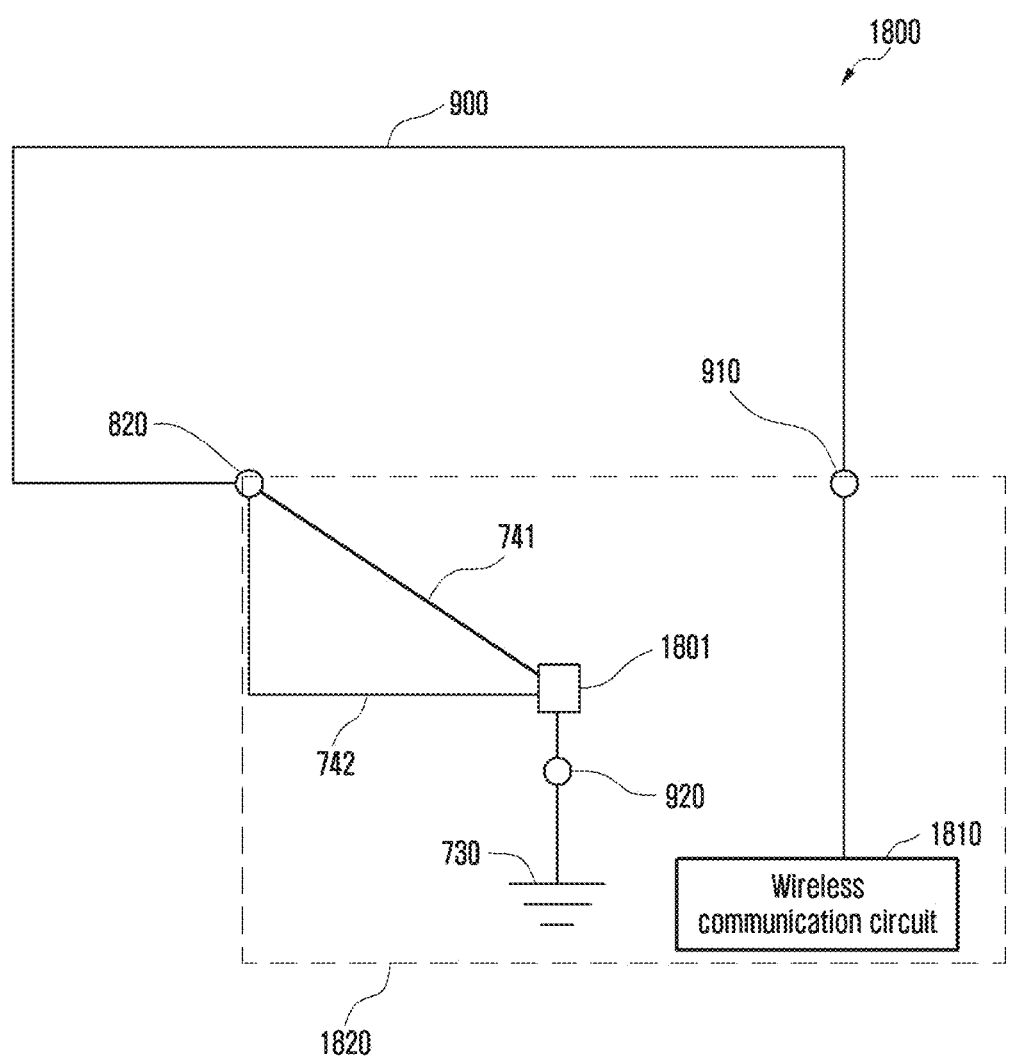
FIG. 18 is a circuit diagram of an antenna system according to various embodiments.

FIG. 18 is a circuit diagram of an antenna system 1800 according to various embodiments.

Referring to FIG. 18, in an embodiment, the antenna system 1800 may include a first conductive area 900, a feeding structure 910, a wireless communication circuit 1810, a grounding portion 920, a ground 930, a first electrical path 741, a second electrical path 742, or a switch circuit 1801. The first conductive area 900 may be implemented by the side member 218 and the first support member 311 in FIG. 8. A circuit 1820 including the wireless communication circuit 1810, the first electrical path 741, the second electrical path 742, the switch circuit 1801, and/or the ground 930 may be disposed on the printed circuit board 400 in FIG. 7.

According to an embodiment, under the control of the processor 120 in FIG. 1, the switch circuit 1801 may selectively control one of the first electrical path 741 and the second electrical path 742 to electrically connect to the grounding portion 920. For example, the resonant frequency when the first electrical path 741 is electrically connected to the grounding portion 920 may be different from the resonant frequency when the second electrical path 742 is electrically connected to the grounding portion 920. According to various embodiments, the switch circuit 1801 may be controlled such that both the first electrical path 741 and the second electrical path 742 are electrically connected to the grounding portion 920. The control of the switch circuit 1801 may change the electrical path of the radiation current, so that the resonant frequency of the antenna system 1800 may vary.

An electronic device (e.g., the electronic device 200 in FIG. 3) according to an example embodiment of the disclosure may include a housing (e.g., the housing 210 in FIG. 2A) including a front plate (e.g., the front plate 202 in FIG. 3), a rear plate (e.g., the rear plate 211 in FIG. 3) positioned on an opposite side of the front plate, and a side bezel (e.g., side member 218 in FIG. 3) that at least partially surrounds a space between the front plate and the rear plate. The side bezel may include a first conduction unit comprising a conductor (e.g., the first conduction unit 501 in FIG. 8), a second conduction unit comprising a conductor (e.g., the second conduction unit 502 in FIG. 8) having a first segment (e.g., the first segment 531 in FIG. 8) interposed between the second conduction unit and one end (e.g., one end 501a in FIG. 8) of the first conduction unit, and a third conduction unit comprising a conductor (e.g., the third conduction unit 503 in FIG. 8) having a second segment (e.g., the second segment 532 in FIG. 8) interposed between the third conduction unit and the opposite end (e.g., the opposite end 501b in FIG. 8) of the first conduction unit. The electronic device may include a support (e.g., the support member 311 in FIG. 8) positioned in the space and connected to the first conduction unit, the second conduction unit, and the third conduction unit, and including a first opening (e.g., the first opening 801 in FIG. 8) extending from the first segment to be positioned within a specified proximity of the first conduction unit. The electronic device may include a printed circuit board (e.g., the printed circuit board 400 in FIG. 7) positioned between the support and the rear plate in the space. The printed circuit board may include: a first terminal (e.g., the first terminal 710 in FIG. 7) and a second terminal (e.g., the second terminal 720 in FIG. 7) electrically connected to at least a portion of the support surrounding the first opening. The printed circuit board may include a ground plane (e.g., the ground 730 in FIG. 7). The printed circuit board may include a first electrical path (e.g., the first electrical path 741 in FIG. 7) electrically connecting the second terminal to a first position (e.g., the first position 731 in FIG. 7) of the ground plane. The printed circuit board may include a second electrical path (e.g., the second electrical path 742 in FIG. 7) electrically connecting the second terminal to a second position (e.g., the second position 732 in FIG. 7) of the ground plane. The electronic device may include a wireless communication circuit (e.g., the wireless communication circuit 1010 in FIG. 10) electrically connected to the first terminal and configured to transmit and/or receive a signal in a selected or specified frequency band. When viewed from above of the rear plate, at least a portion of the first opening may extend to the first segment between the first terminal and the second terminal.

According to an example embodiment, the printed circuit board (e.g., the printed circuit board 700 in FIG. 7) may include a non-conductive area at least partially overlapping the first opening (e.g., the first opening 801 in FIG. 9) when viewed from above of the rear plate (e.g., the rear plate 211 in FIG. 3).

According to an example embodiment, the first electrical path (e.g., the first electrical path 741 in FIG. 9) and the second electrical path (e.g., the second electrical path 742 in FIG. 9) may have different lengths.

According to an example embodiment, the first electrical path or the second electrical path may overlap the first opening (e.g., the first opening 801 in FIG. 9) when viewed from above of the rear plate (e.g., the rear plate 211 in FIG. 3).

According to an example embodiment, at least a portion of the support (e.g., the first support member 311 in FIG. 8) surrounding the first opening (e.g., the first opening 801 in FIG. 9) may include a third terminal (e.g., the third terminal 810 in FIG. 9) electrically connected to the first terminal (e.g., the first terminal 710 in FIG. 9) and a fourth terminal (e.g., the fourth terminal 820 in FIG. 9) electrically connected to the second terminal (e.g., the second terminal 720 in FIG. 9). A portion of the first opening may be positioned between the third terminal and the fourth terminal.

According to an example embodiment, the third terminal (e.g., the third terminal 810 in FIG. 9) and the fourth terminal (e.g., the fourth terminal 820 in FIG. 9) may be positioned closer to the first segment (e.g., the first segment 531 in FIG. 8) than the second segment (e.g., the second segment 532 in FIG. 8).

According to an example embodiment, the third terminal (e.g., the third terminal 810 in FIG. 9) may not overlap the ground plane (e.g., the ground 730 in FIG. 9) when viewed from above of the rear plate (e.g., the rear plate 211 in FIG. 3).

According to an example embodiment, at least a portion of the support (e.g., the support member 311 in FIG. 9) surrounding the first opening (e.g., the first opening 801 in FIG. 9) may be electrically connected to the first terminal (e.g., the first terminal 710 in FIG. 9) or the second terminal (e.g., the second terminal 720 in FIG. 9) through a flexible conductive member comprising a conductor between the support and the printed circuit board.

According to an example embodiment, at least a portion of the support (e.g., the support member 311 in FIG. 9) surrounding the first opening (e.g., the first opening 801 in FIG. 9) may be electrically connected to the first terminal (e.g., the first terminal 710 in FIG. 9) or the second terminal (e.g., the second terminal 720 in FIG. 9) through a bolt connecting the support and the printed circuit board.

According to an example embodiment, the second conduction unit (e.g., the second conduction unit 502 in FIG. 5) may form a portion of a first side surface (e.g., the first side surface 521 in FIG. 5) facing in a first direction. The third conduction unit (e.g., the third conduction unit 502 in FIG. 5) may form a portion of a second side surface (e.g., the second side surface 522 in FIG. 5) facing in a second direction perpendicular to the first direction. The first conduction unit (e.g., the first conduction unit 501 in FIG. 5) may form a portion of the first side surface, a portion of the second side surface, and a corner connecting the first side surface and the second side surface.

According to an example embodiment, the printed circuit board (e.g., the printed circuit board 400 in FIG. 7) may further include a switch (e.g., the switch 1700 in FIG. 17). The switch may be configured to electrically connect the first electrical path (e.g., the first electrical path 1741 in FIG. 17) to the first position (e.g., the first grounding portion 731 in FIG. 7) or electrically connect the second electrical path (e.g., the second electrical path 742 in FIG. 17) to the second position (e.g., the second grounding portion 732 in FIG. 7).

According to an example embodiment, the support (e.g., the support member 311 in FIG. 8) may further include a second opening (e.g., the second opening 802 in FIG. 8) extending from the second segment (e.g., the second segment 532 in FIG. 8) positioned within a specified proximity of the first conduction unit (e.g., the first conduction unit 501 in FIG. 8). The support may further include a first extension (e.g., the first extension 851 in FIG. 8) extending to the first conduction unit between the first opening (e.g., the first opening 801 in FIG. 8) and the second opening.

According to an example embodiment, the electronic device may further include a conductive member comprising a conductive material positioned on the printed circuit board (e.g., the printed circuit board 400 in FIG. 7) and at least partially overlapping the first extension (e.g., the first extension 851 in FIG. 15). The conductive member may include a sim socket (e.g., the sim socket 1330 in FIG. 13 or 15) or the ground plane (e.g., the ground 730 in FIG. 7).

According to an example embodiment, at least a portion of the support (e.g., the support member 311 in FIG. 9) surrounding the first opening (e.g., the first opening 801 in FIG. 9) may include a third terminal (e.g., the third terminal 810 in FIG. 9) electrically connected to the first terminal (e.g., the first terminal 710 in FIG. 9). The third terminal may include a shape protruding toward the first extension (e.g., the first extension 851 in FIG. 9) with a portion of the first opening interposed therebetween.

According to an example embodiment, the wireless communication circuit (e.g., the wireless communication circuit 1010 in FIG. 10) may be electrically connected to the second conduction unit (e.g., the second conduction unit 502 in FIG. 8) or the third conduction unit (e.g., the third conduction unit 503 in FIG. 8). The wireless communication circuit may be configured to transmit and/or receive a signal in a frequency band different from the selected or specified frequency band through the second conduction unit or the third conduction unit.

According to an example embodiment, the selected or specified frequency band may include 2.3 GHz to 6 GHz.

According to an example embodiment, the electronic device may further include a non-conductive member comprising an insulating material (e.g., the non-conductive member 312 in FIG. 4) connected to the support (e.g., the support member 311 in FIG. 4) in the space and extending to the first segment (e.g., the first segment 531 in FIG. 5), the second segment (e.g., the second segment 532 in FIG. 5), and the third segment (e.g., the third segment 533 in FIG. 5).

According to an example embodiment, the first conduction unit (e.g., the first conduction unit 501 in FIG. 4) may include an opening (e.g., the opening 512a in FIG. 4) configured for attaching and detaching a memory card.

According to an example embodiment, the electronic device may further include a display (e.g., the display 201 in FIG. 3) positioned between the front plate (e.g., the front plate 202 in FIG. 3) and the support (e.g., the support member 311 in FIG. 4) in the space and visible through the front plate.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a housing comprising a front plate, a rear plate positioned on the opposite side of the front plate, and a side bezel surrounding at least a portion of a space between the front plate and the rear plate, and comprising a first conduction unit comprising a conductor, a second conduction unit comprising a conductor positioned to have a first segment interposed between the second conduction unit and one end of the first conduction unit, and a third conduction unit comprising a conductor positioned to have a second segment interposed between the third conduction unit and an other end of the first conduction unit;
a support positioned inside the space to be connected to the first conduction unit, the second conduction unit, and the third conduction unit, and comprising a first opening extending from the first segment to be positioned within a specified proximity of the first conduction unit;
a printed circuit board positioned inside the space between the support and the rear plate and comprising first and second terminals electrically connected to at least a portion of the support surrounding the first opening, a ground plane, a first electrical path electrically connecting the second terminal to a first position of the ground plane, and a second electrical path electrically connecting the second terminal to a second position of the ground plane; and
a wireless communication circuit electrically connected to the first terminal and configured to transmit and/or receive a signal in a selected or specified frequency band,
wherein, when viewed from above of the rear plate, at least a portion of the first opening extends to the first segment by passing between the first terminal and the second terminal.

2. The electronic device of claim 1, wherein the printed circuit board comprises a non-conductive area at least partially overlapping the first opening when viewed from above of the rear plate.

3. The electronic device of claim 1, wherein the first electrical path and the second electrical path have different lengths.

4. The electronic device of claim 1, wherein the first electrical path or the second electrical path overlaps the first opening when viewed from above of the rear plate.

5. The electronic device of claim 1, wherein at least a portion of the support surrounding the first opening comprises:
a third terminal electrically connected to the first terminal; and
a fourth terminal electrically connected to the second terminal,
wherein a portion of the first opening is positioned between the third terminal and the fourth terminal,
wherein the third terminal and the fourth terminal are positioned closer to the first segment than the second segment, and
wherein the third terminal does not overlap the ground plane when viewed from above of the rear plate.

6. The electronic device of claim 1, wherein at least a portion of the support surrounding the first opening is electrically connected to the first terminal or the second terminal through a flexible conductive member comprising a conductor between the support and the printed circuit board.

7. The electronic device of claim 1, wherein at least a portion of the support surrounding the first opening is electrically connected to the first terminal or the second terminal through a bolt connecting the support and the printed circuit board.

8. The electronic device of claim 1, wherein the second conduction unit forms a portion of a first side surface facing in a first direction,
wherein the third conduction unit forms a portion of a second side surface facing in a second direction perpendicular to the first direction, and
wherein the first conduction unit forms a portion of the first side surface, a portion of the second side surface, and a corner connecting the first side surface and the second side surface.

9. The electronic device of claim 1, wherein the printed circuit board further comprises a switch, and wherein the switch is configured to electrically connect the first electrical path to the first position or to electrically connect the second electrical path to the second position.

10. The electronic device of claim 1, wherein the support further comprises:
a second opening extending from the second segment to be within a specified proximity of the first conduction unit; and
a first extension extending to the first conduction unit between the first opening and the second opening.

11. The electronic device of claim 10, further comprising a conductive member comprising a conductive material positioned on the printed circuit board and at least partially overlapping the first extension,
wherein the conductive member comprises a sim socket or the ground plane.

12. The electronic device of claim 10, wherein at least a portion of the support surrounding the first opening comprises a third terminal electrically connected to the first terminal, and
wherein the third terminal has a shape protruding toward the first extension with a portion of the first opening interposed therebetween.

13. The electronic device of claim 1, wherein the wireless communication circuit is electrically connected to the second conduction unit or the third conduction unit and is configured to transmit and/or receive a signal in a frequency band different from the selected or specified frequency band through the second conduction unit or the third conduction unit.

14. The electronic device of claim 1, further comprising a non-conductive member comprising an insulating material connected to the support in the space and extending to the first segment, the second segment, and the third segment.

15. The electronic device of claim 1, wherein the first conduction unit comprises an opening for attaching and detaching a memory card.

* * * * *